United States Patent
Shim et al.

(10) Patent No.: US 10,152,151 B2
(45) Date of Patent: Dec. 11, 2018

(54) STYLUS PEN, TOUCH PANEL, AND COORDINATE INDICATING SYSTEM HAVING THE SAME

(71) Applicant: Samsung Electronics Co., Ltd., Suwon-si, Gyeonggi-do (KR)

(72) Inventors: Hui-jun Shim, Seoul (KR); Sung-soo Park, Suwon-si (KR); Byung-hoon Kang, Suwon-si (KR); Sung-wan Hong, Seongnam-si (KR); Se-hyun Han, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 14/995,567

(22) Filed: Jan. 14, 2016

(65) Prior Publication Data

US 2016/0209944 A1 Jul. 21, 2016

(30) Foreign Application Priority Data

Jan. 16, 2015 (KR) ........................ 10-2015-0008021

(51) Int. Cl.
*G06F 3/041* (2006.01)
*G06F 3/0354* (2013.01)
*G06F 3/044* (2006.01)
*G06F 3/038* (2013.01)

(52) U.S. Cl.
CPC .............. *G06F 3/041* (2013.01); *G06F 3/038* (2013.01); *G06F 3/0383* (2013.01); *G06F 3/03545* (2013.01); *G06F 3/044* (2013.01); *G06F 3/0416* (2013.01); *G06F 2203/04104* (2013.01); *G06F 2203/04106* (2013.01)

(58) Field of Classification Search
CPC . G06F 3/041; G06F 3/03; G06F 3/045; G06F 3/042; G01R 27/26; G06K 11/06; G08C 21/00; G09G 3/36
See application file for complete search history.

(56) References Cited

U.S. PATENT DOCUMENTS

| | | | | |
|---|---|---|---|---|
| 5,963,199 | A * | 10/1999 | Kato | G06F 3/0488 345/156 |
| 6,005,555 | A * | 12/1999 | Katsurahira | G06F 3/046 178/18.06 |
| 6,020,849 | A * | 2/2000 | Fukuzaki | G06F 3/046 342/374 |
| 6,184,873 | B1 | 2/2001 | Ward et al. | |
| 8,154,525 | B2 | 4/2012 | Katsurahira | |
| 8,159,474 | B2 | 4/2012 | Hauck | |
| 2008/0128180 | A1 | 6/2008 | Perski et al. | |
| 2008/0156546 | A1* | 7/2008 | Hauck | G06F 3/03545 178/19.01 |

(Continued)

FOREIGN PATENT DOCUMENTS

EP 2 267 587 A2 12/2010
JP 4117751 B2 7/2008

*Primary Examiner* — Pegeman Karimi
(74) *Attorney, Agent, or Firm* — Jefferson IP Law, LLP

(57) ABSTRACT

A touch panel is provided. The touch panel includes a receiver configured to receive response signals from a plurality of objects, and a controller configured to identify positions of the plurality of objects based on different frequencies emitted from each of the plurality of objects in response to the response signals being simultaneously received through the receiver.

9 Claims, 30 Drawing Sheets

(56) References Cited

U.S. PATENT DOCUMENTS

| | | | |
|---|---|---|---|
| 2009/0078476 A1* | 3/2009 | Rimon | G06F 3/03545 |
| | | | 178/18.03 |
| 2009/0251434 A1 | 10/2009 | Rimon et al. | |
| 2012/0105361 A1* | 5/2012 | Kremin | G06F 3/03545 |
| | | | 345/174 |
| 2013/0198675 A1 | 8/2013 | Altwasser | |
| 2014/0062913 A1* | 3/2014 | Lin | G06F 3/044 |
| | | | 345/173 |
| 2014/0078090 A1 | 3/2014 | Frojdh | |
| 2014/0078101 A1 | 3/2014 | Katsurahira | |
| 2014/0132529 A1 | 5/2014 | Jeong | |
| 2014/0168177 A1* | 6/2014 | Mkrtchyan | G06F 3/03545 |
| | | | 345/179 |
| 2014/0247238 A1 | 9/2014 | Chang | |
| 2014/0300585 A1* | 10/2014 | Dowd | G06F 3/0416 |
| | | | 345/179 |
| 2014/0320445 A1* | 10/2014 | Kim | G06F 3/03545 |
| | | | 345/174 |
| 2015/0338968 A1* | 11/2015 | Yao | G06F 3/0383 |
| | | | 345/174 |

\* cited by examiner

| FREQUENCY | KIND OF OBJECT |
|---|---|
| 200-300kHz | Action Pen |
| 300-400kHz | Eraser |
| 500-600kHz | Passive Pen |
| 600-700kHz | Object |

FIG. 12

|         | Tx | ID | PRESSURE | ROTATION | FREQUENCY |
|---------|----|----|----------|----------|-----------|
| ERASER  | x  | x  | x        | o        | H         |
| ACTIVE PEN | x | x | o       | x        | H         |
| PASSIVE PEN | o | x | o      | x        | H         |
| OBJECT  | o  | o  | x        | x        | L         |

STYLUS PEN, TOUCH PANEL, AND COORDINATE INDICATING SYSTEM HAVING THE SAME

CROSS-REFERENCE TO RELATED APPLICATION(S)

This application claims the benefit under 35 U.S.C. § 119(a) of a Korean patent application filed on Jan. 16, 2015 in the Korean Intellectual Property Office and assigned Serial number 10-2015-0008021, the entire disclosure of which is hereby incorporated by reference.

TECHNICAL FIELD

The present disclosure relates to a stylus pen, a touch pen, and a coordinate indicating system having the same. More particularly, the present disclosure relates to a stylus pen, a touch pen, and a coordinate indicating system having the same which are capable of simultaneously measuring positions of a plurality of stylus pens.

BACKGROUND

In recent years, smart phones or tablet personal computers (PCs) have been brought to market, and techniques for contact position measurement devices have been actively developed. The smart phones or tablet PCs typically include touch screens, and the user may designate specific coordinates of the touch screen using a stylus pen. The user may input a specific signal to the smart phone through the designation of the specific coordinates of the touch screen.

The current touch screens may identify a position of the stylus pen as well as a type of stylus pen. In response to a plurality of stylus pens being simultaneously contacted, the electronic white board needs to classify the positions and the types of stylus pens.

However, a lot of time is required to detect the positions of the plurality of stylus pens in that the positions of the stylus pens are detected in the time division manner in the related art. For example, in the related art, since a position of a pen A is determined and then a position of a pen B is determined, an amount of time to determine the positions increases as the number of pens is increased, and thus it may be difficult to detect the positions of the plurality of pens in real time.

The touch screens in the related art may detect only positions of stylus pens operated through the same manner. For example, the touch screen capable of detecting a position of a passive type stylus pen may not detect a position of an active type stylus pen. The touch screen capable of detecting a position of the active type stylus pen may not detect a position of the passive type stylus pen. Accordingly, there is a need for a method for simultaneously detecting positions of various types of the stylus pens regardless of the types of the stylus pens.

The current touch screens may detect the position of the stylus pen as well as the writing pressure in the corresponding position, and perform various actions according to the detected position and writing pressure. For this operation, the writing pressure is measured using a variable capacitor of which capacitance is varied according to the writing pressure of the pen in the related art. However, the fine calibration of the variable capacitor s difficult, and thus it is difficult to implement the stylus pens to have the same writing pressure.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below.

One or more embodiments relate to a stylus pen, a touch pen, and a coordinate indicating system having the same which are capable of simultaneously measuring positions of different types of the stylus pens.

One or more embodiments relate to a touch panel cable of simultaneously measuring positions of different types of the stylus pens and a coordinate indicating system having the same.

One or more embodiments relate to a stylus pen capable of accurately detecting writing pressure and a coordinate indicating system having the same.

In accordance with an aspect of the present disclosure, a touch panel is provided. The touch panel includes a receiver configured to receive response signals from a plurality of objects, and a controller configured to identify positions of the plurality of objects based on different frequencies emitted from each of the plurality of objects in response to the response signals being simultaneously received through the receiver.

The controller may identify respective objects of the plurality of objects based on a different frequency band corresponding to each of the plurality of objects.

The receiver may include a plurality of antenna loops.

The touch panel may further include a detector configured to simultaneously detect the response signals corresponding to the plurality of objects from the plurality of antenna loops. The detector may include an amplifier configured to amplify the response signals received in at least one antenna loop through the receiver and output the amplified response signals, an analog to digital converter (ADC) configured to convert the amplified response signals to digital signals, and a signal processor configured to extract preset frequency components from the response signals converted to the digital signals.

The detector may sequentially detect the response signals of the plurality of antenna loops.

The detector may detect the response signals of the plurality of antenna loops in parallel in units of a plurality of channels.

The controller may alternately perform a first scanning operation that determines a position of a contact object using all the response signals of the plurality of antenna loops and a second scanning operation that determine a position of a contact object only using a response signal of a loop group corresponding to the detected contact object in the first scanning operation.

The controller may determine the position of the contact object by additionally using a response signal of another loop group adjacent to the loop group in response to a number of contact objects determined in the second scanning operation being smaller than a number of contact objects determined in a previous process.

The controller may determine a type of the contact object, and perform the second scanning operation by classifying the second scanning operation according to the determined type of the contact object.

The controller may determine the type of the contact object based on a frequency band of a response signal by the contact object.

The receiver may include a plurality of antenna loops and a plurality of electrodes.

The touch panel may further include a driver configured to apply a driving signal to the plurality of electrodes before the first scanning operation.

The touch panel may further include a driver configured to, in response to at least one of the contact objects being a passive stylus pen having a resonant circuit, apply a driving signal to the plurality of electrodes before the second scanning operation for determining a position of the passive stylus pen.

The plurality of antenna loops may be arranged in a second layer below a first layer in which the plurality of electrodes is arranged.

In accordance with another aspect of the present disclosure, a stylus pen is provided. The stylus pen includes a divider configured to generate division signals divided into different frequency signals, and a driver configured to generate a response signal based on a writing pressure value for the stylus pen and the generated division signals to drive the stylus pen.

The stylus pen may further include a selector configured to receive selection for an operation state of the stylus pen. The divider may divide a preset frequency by a division ratio corresponding to the selected operation state.

The operation state may be at least one of a color state of the stylus pen and an eraser state.

The stylus pen may further include a tip of which a resistance value is changed according to the writing pressure value of the stylus pen.

The stylus pen may further include a crystal oscillator configured to generate the preset frequency only in an initial operation of the stylus pen.

In accordance with another aspect of the present disclosure, a coordinating indicating system is provided. The coordinating indicating system includes a touch panel configured to detect a plurality of response signals from a plurality of objects, and a plurality of stylus pens configured to separately transmit the plurality of response signals to the touch panel. The touch panel may simultaneously receive the plurality of response signals corresponding to the plurality of stylus pens, and identify positions of the plurality of stylus pens based on the plurality of received response signals.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a diagram illustrating an example of a frequency range assigned to different types of the objects according to an embodiment of the present disclosure;

FIG. 12 is a diagram illustrating characteristics of various types of the objects according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

The terms "first", "second", etc. may be used to describe diverse components, but the components are not limited by the terms. The terms are only used to distinguish one component from the others.

In the present application, the terms "include" and "consist of" designate the presence of features, numbers, operations, components, elements, or a combination thereof that are written in the specification, but do not exclude the presence or possibility of addition of one or more other features, numbers, operations, components, elements, or a combination thereof.

Figure 1:
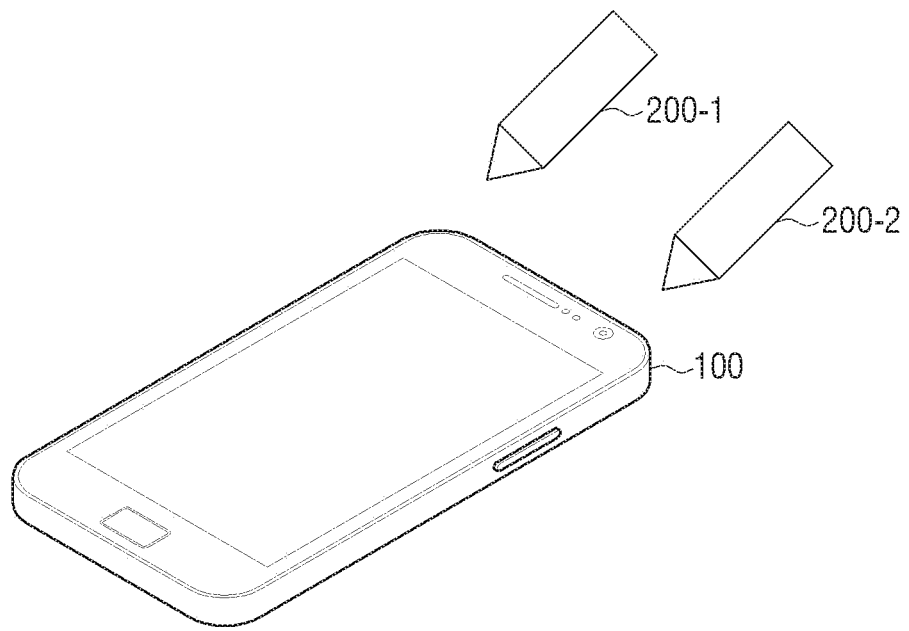
FIG. 1 is a diagram illustrating a configuration of a coordinate indicating system according to an embodiment of the present disclosure.

FIG. 1 is a block diagram illustrating a configuration of a coordinate indicating system according to an embodiment of the present disclosure.

Referring to FIG. 1, a coordinate indicating system 300 may include a touch panel 100 and a plurality of stylus pens 200-1 and 200-2.

The touch panel 100 may determine positions of the stylus pens 200-1 and 200-2 (or objects). For example, the touch panel 100 may include a plurality of antenna loops, and may determine positions of stylus pens on the touch panel 100 based on response signals of the plurality of antenna loops received in the plurality of antenna loops. In this example, the touch panel 100 may simultaneously determine positions of the plurality of stylus pens by simultaneously receiving and signal-processing response signals having deferent frequencies corresponding to a plurality of objects. The detailed configuration and operation of the touch panel 100 will be described with reference to FIG. 2 further below. The touch panel 100 may include a digitizer, a tablet, a touch panel, a touch screen, and the like. The touch panel 100 may include an electronic white board, a laptop computer, a portable phone, a smart phone, a portable media player (PMP), a Moving Picture Experts Group phase 1 or phase 2 (MPEG-1 or MPEG-2) audio layer 3 (MP3) player, and the like which include the digitizer, the tablet, the touch panel, or the touch screen.

The stylus pens 200-1 and 200-2 may transmit the response signals to at least one antenna loop in the touch panel 100. The stylus pens 200-1 and 200-2 may be implemented in a pen-like form, but this is not limited thereto. The stylus pens 200-1 and 200-2 may be implemented in various forms such as an eraser.

The plurality of stylus pens 200-1 and 200-2 (hereinafter, the stylus pens 200-1 and 200-2 may be collectively referred to as the stylus pen 200) may be may transmit the response signals having the different frequency bands to the touch panel 100. The stylus pens 200-1 and 200-2 may be operated in a passive type or an active type. The passive type may be a method which receives a driving signal from the touch panel 100 and generate a response signal based on the received driving signal, that is, a method operated without its own power. The active type may be a method which generates a response signal through its own power. The active type stylus pen will be described with reference to FIG. 17 further below, and the passive type stylus pen will be described with reference to FIG. 21 further below. The stylus pen (or object) may be a conductive object, an object having a resonant circuit, a board maker, a pen, and the like.

The coordinate indicating system 300 according to the above-described embodiment may determine positions through a frequency analysis method using the response signals having different frequencies. That is, the coordinate indicating system 300 may simultaneously determine the positions of the plurality of stylus pens. The coordinate indicating system 300 may support both the passive type stylus pen and the active stylus pen, and thus user convenience may be improved.

The coordinate indicating system 300 may use the touch panel 100 to determine the positions of the stylus pens 200-1 and 200-2 which emit the response signals, and also the coordinate indicating system 300 may determine a position of a finger by detecting capacitance change of an electrode according to the position of the finger, signal magnitude change due to the capacitance change, and the like. However, the operation of determining the position of the finger in the touch panel 100 is widely known technology, and thus only technology for detecting the position of stylus pen will be described herein.

FIG. 1 has been illustrated that the stylus pens 200-1 and 200-2 are coupled to the touch panel 100, but the coordinate indicating system 300 may be implemented such that one stylus pen is coupled to one touch panel 100, or three or more stylus pens are coupled to one touch panel.

The coordinate indicating system 300 may use the touch panel 100 to receive the response signals using the plurality of antenna loops, and also the coordinate indicating system 300 may be implemented such that the touch panel 100 may receive the response signals using a plurality of electrodes, or in a form that the touch panel 100 may receive the response signals using the plurality of antenna loops and the plurality of electrodes. The touch panel 100 having the forms will be described with reference to FIG. 4 further below.

Figure 2:
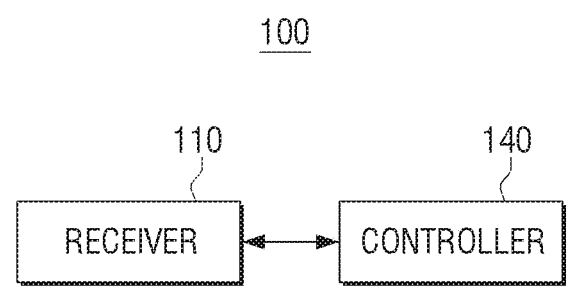
FIG. 2 is a schematic block diagram illustrating a configuration of a touch panel of FIG. 1 according to an embodiment of the present disclosure.

FIG. 2 is a block diagram illustrating a detailed configuration of the touch panel of FIG. 1 according to an embodiment of the present disclosure.

Referring to FIG. 2, the touch panel 100 may include a receiver 110 and a controller 140. The touch panel may include a digitizer, a tablet, a touch screen, a touch pad, and the like. The touch panel 100 may include a laptop computer, a portable phone, a smart phone, a portable media player (PMP), an MP3 player, and the like which include the digitizer, the tablet, the touch pad, the touch screen, and the like.

The receiver 110 may detect response signals of a plurality objects. For example receiver 110 may include a plurality of antenna loops, for example, the receiver 110 include a plurality of antenna loops disposed in a matrix form. In this example, the receiver 110 may include a plurality of first antenna loops disposed in a first direction and a plurality of second antenna loops disposed in a second direction crossing the first direction. The configuration and operation of the plurality of antenna loops included in the receiver 110 will be described with reference to FIG. 3 further below.

The antenna loop may be an antenna which receives an electric field emitted from the stylus pen 200 through a loop coil. One antenna loop may constitute one channel, but a plurality of antenna loops may form one channel by mutually coupling the plurality of antenna loops. The channel may refer to a signal processing unit in a detector. For example, in response to ten antenna loops being independently coupled to the detector, a corresponding detector may have ten channels. In response to ten antenna loops being coupled to the detector by coupling the antenna loops by two, a corresponding detector may have five channels.

The controller 140 may identify positions of a plurality of objects in response to response signals being simultaneously detected. For example, the controller 140 may identify the positions of the plurality of objects based on different frequencies emitted from the plurality of objects. In this example, in response to the plurality of antenna loops being included in the receiver 110, the controller 140 may determine the positions of the stylus pens 200-1 and 200-2 based on the response signals received in the plurality of antenna loops. The controller 140 may simultaneously determine the positions of the plurality of stylus pens. For example, the controller 140 may determine positions of the plurality of stylus pens based on frequency components (or frequency bands) corresponding to a plurality of objects.

For example, in response to the plurality of antenna loops being configured in a matrix form so that the plurality of first antenna loops are disposed in the first direction and the plurality of second antenna loops are disposed in the second direction perpendicular to the first direction, the controller 140 may determine the positions of the stylus pens based on a magnitude ratio of a frequency component (that is, a peak value in a specific frequency band) corresponding to the stylus pen in the response signal received in the first antenna loop and a magnitude ratio of a frequency component in a response signal received in the second antenna loop with respect to the plurality of stylus pens 200.

The controller 140 may detect contact pressure of the stylus pen 200 based on change in the frequency component of the received response signal (that is, change in the peak value in the specific frequency band), or may detect an operation mode of stylus pen based on the change in the frequency component of the received response signal. An amount in the change of the frequency component may be in a range which may not be grasped through other stylus pens. For example, in response to different stylus pens having frequency differences in units of 20 kHz, the operation mode have a frequency difference in units of 10 kHz, and contact pressure may be changed in a 5 kHz range.

The controller 140 according to the embodiment may detect only positions of a plurality of stylus pens in the active manner or may detect positions of a plurality of stylus pens operated in the passive manner. The controller 140 may simultaneously detect the positions of the passive type stylus pens and the active type pens. The detailed configuration and operation of the controller which detects the positions of the stylus pens operated in the active manner will be preferentially described with reference to the configuration of FIG. 3, and the detailed configuration and operation of controller which may detect the positions of the stylus pens operated in the passive manner will be described with reference to FIG. 4 further below.

The touch panel 100 according to the above-described embodiment may simultaneously determine the positions in the frequency analysis method using the response signals having different frequencies. That is, the touch panel 100 may simultaneously detect the positions of the plurality of stylus pens.

The basic configuration of the touch panel 100 has been described above, but the touch panel 100 may further include another configuration other than the above-described configuration. For example, the touch panel 100 may further include a display configuration in response to the touch panel 100 being a touch screen, and the touch panel 100 may further include a display, a storage unit, a communication configuration, and the like, in response to the touch panel 100 being an apparatus such as a smart phone or a PMP It has been described that the touch panel 100 may receive only the response signal without the driving signal being provided, that is, the touch panel 100 may detect only the position of the active type stylus pen, but the touch panel 100 may also detect the position of the passive stylus pen by providing the driving signal in preset period units. The operation of the touch panel will be described with reference to FIG. 4 further below.

Figure 3:
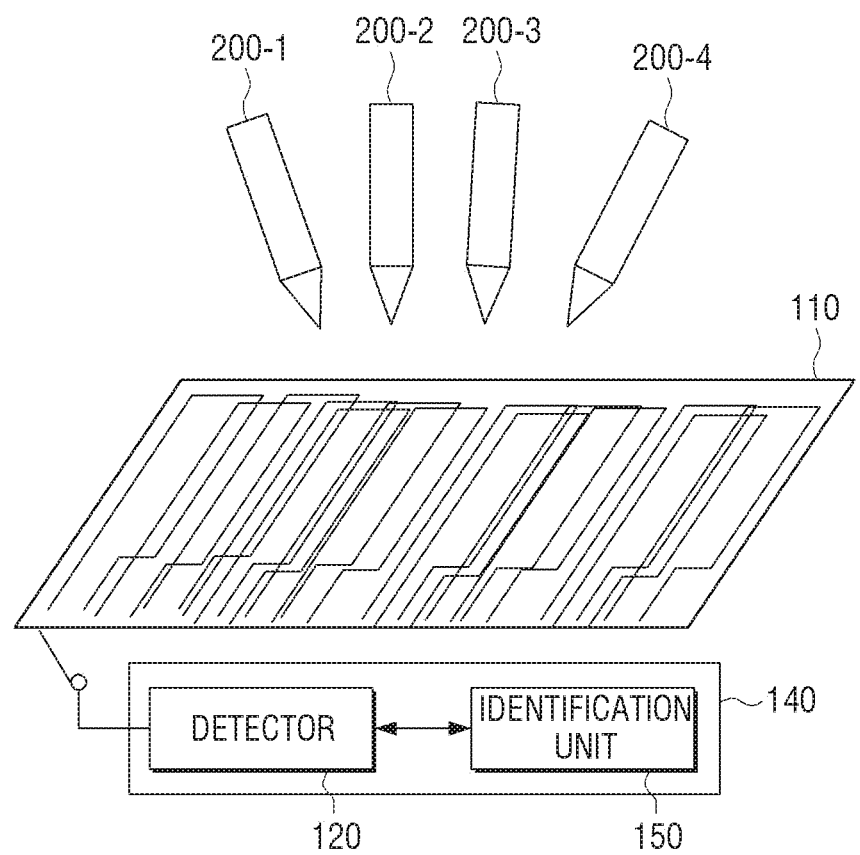
FIG. 3 is a circuit diagram illustrating a touch panel according to an embodiment of the present disclosure.

FIG. 3 is a diagram illustrating a circuit of a touch panel according to an embodiment of the present disclosure. For example, the touch panel according to an embodiment is an example of a touch panel which detects positions of a plurality of stylus pens operated only in the active manner.

Referring to FIG. 3, the touch panel 100 may be configured of the receiver 110 and the controller 140.

The receiver 110 may be configured of a plurality of antenna loops. The antenna loop may be an antenna which receives an electric field emitted from the stylus pen 200 through a loop coil.

One antenna loop may constitute one channel, but the receiver 110 may be implemented with a plurality of antenna loops may form one channel by mutually coupling the plurality of antenna loops. The channel may refer to a signal processing unit in a detector. For example, in response to ten antenna loops being independently coupled to the detector, a corresponding detector may have ten channels. In response to ten antenna loops being coupled to the detector by coupling the antenna loops by two, a corresponding detector may have five channels.

An example of a response signal received in the antenna loop will be described with reference to FIGS. 8A to 8C and 9 further below.

The example has been illustrated that a plurality of antenna loops are disposed only in a Y-direction, but this is to simplify the drawing. The receiver 110 may be implemented such that the plurality of antennas may be disposed in the Y-direction and an X-direction. For example, the receiver 110 may include a first loop group and a second loop disposed in different directions from each other.

The first loop group may include a plurality of first antenna loops disposed to a first direction (horizontal direction). The second loop group may include a plurality of second antenna loop disposed to a second direction (vertical direction).

First antenna loops 111-1 may be disposed in the first direction (horizontal direction) and a portion of the first antenna loops 111-1 may be disposed to the second direction (the vertical direction) in that the antenna loop has a loop form. However, most of the first antenna loops 111-1 may be disposed to the first direction, and thus the first antenna loops 111-1 may refer to be disposed to the first direction.

The controller 140 may identify a position of an object. For example, the controller 140 may be configured of a detector 120 and an identification unit 150.

Figure 8A:
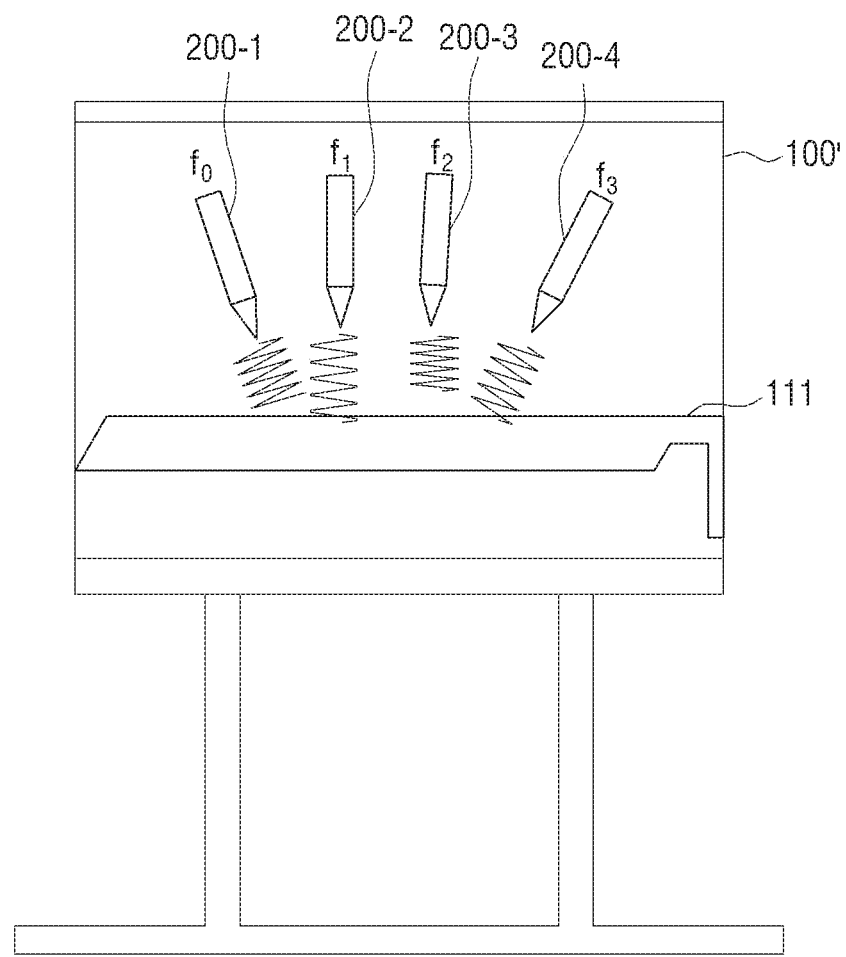
FIGS. 8A, 8B, and 8C are diagrams illustrating an operation in one antenna loop according to an embodiment of the present disclosure.

The detector 120 may detect a response signal from at least one antenna loop. The detector 120 may sequentially detect response signals of all the plurality of antenna loops or may detect the response signals of all the plurality of antenna loops in parallel in units of a plurality of antenna loops. The response signals performed in this process may be response signals having different frequencies. The plurality of response signals may be response signals which are individually received from different stylus pens. For example, as illustrated in FIG. 8A, at least one antenna loop may simultaneously receive the response signals from the plurality of different stylus pens. The response signals may be response signals in the passive manner or response signals in the active manner. In this regard, the plurality of response signals may be a plurality of response signals in the active manner or a plurality of response signals in which the response signals in the active manner and the response signal in the passive manner are mixed.

In response to the plurality of response signals received from the plurality of stylus pens having the same frequency, the touch panel 100 cannot distinguish (or identify) the stylus pens corresponding to the plurality of received response signals. In this regard, the stylus pen 200 in the embodiment may transmit the response signals having different frequencies to the touch panel 100.

The different frequencies may mean that center frequencies included in the response signals are different. For example, as illustrated in FIG. 3, center frequencies of four response signals of four stylus pens may have different frequencies from each other.

To receive and process the response signals more rapidly, the detector 120 may detect only response signals for partial antenna loops. The detailed configuration and operation of the detector 120 will be described with reference to FIGS. 5 and 6 further below.

The detector 120 may variously perform signal-processing on the received response signals. For example, the detector 120 may amplify the response signals using amplifiers. The detector 120 may perform signal processing for extracting only information within a preset frequency from the received response signal.

Figure 15:
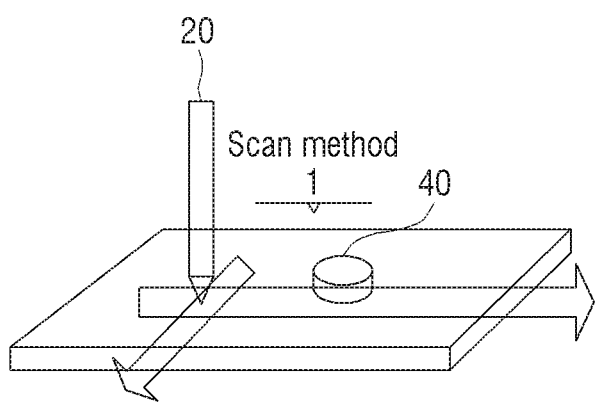
FIG. 15 is a diagram illustrating a second scanning method for a first stylus pen according to an embodiment of the present disclosure.

The identification unit 150 may identify the type of an object based on a frequency band of a response signal of a stylus pen. For example, in the embodiment, the response signals having different frequencies may be generated from the stylus pens, and as illustrated in FIG. 15, the response signals having the different frequency bands may be generated according to the types of the stylus pens. Thus, the identification unit 150 may determine the type of the stylus pen based on the frequency band of the detected response signal.

The identification unit 150 may control the detector 120 to alternately perform a first scanning operation which determine the position of the stylus pen using all the response signals of the plurality of antenna loops and a second scanning operation which determines the position of the stylus pen using only response signals in a loop group corresponding to the position-determined stylus pen in the first scanning operation.

The first scanning operation may be a scanning operation which determines whether or not a new stylus pen which is not determined in a previous process is presented. Since the type and position of the new stylus pen is not determined, the identification unit 150 may receive the response signals of all the antenna loops to detect the position of the active type stylus pen with respect to all regions.

The second scanning operation may be a scanning operation which precisely determines change in the position of the stylus pen determined in a previous process. Since the position and type of the pre-detected stylus pen have been determined, the identification unit 150 may update the position of the existing stylus pen rapidly using only the response signal of the antenna loop corresponding to the pre-detected position through a manner corresponding to the corresponding type.

In response to the number of stylus pens determined through the second scanning operation being smaller than the number of predetermined stylus pen, the identification unit 150 may detect the position of the stylus pen by additionally using a response signal of another loop group close to a loop group which receives a response signal. The embodiment has described that a range of the second scanning operation may be changed in response to the number of determined stylus pens being changed, but the identification unit 150 may be implemented to perform the first scanning operation in response to the number of stylus pens being changed.

The second scanning operation may be performed in units of the type of the detected stylus pen. For example, in response to the pre-detected stylus pen being three active type stylus pens, the second scanning operation may be performed once in one type manner. In another example, in response to the pre-detected stylus pen being two active type stylus pens and one eraser object, the second scanning operation may be performed once in the active type and may be performed once in a manner for an identification (ID) signal reception. As the type of stylus pen is diversified, a lot of time may be required to detect the positions of the plurality of stylus pens. However, in the embodiment, all positions according to the types of the stylus pens may not be detected, and only response signals of antenna loops corresponding to the detected positions may be processed, and thus time delay may be reduced.

It has been illustrated and described in FIG. 3 that the controller 140 includes the driver and the detector, but the controller 140 may be implemented separately from the driver and the detector.

It has been illustrated and described in FIGS. 1 to 3 that the receiver 110 may be configured of only the plurality of antenna loops, but the receiver 110 may be implemented to further include a plurality of electrodes. This example will be described with reference to FIG. 4 below.

Figure 4:
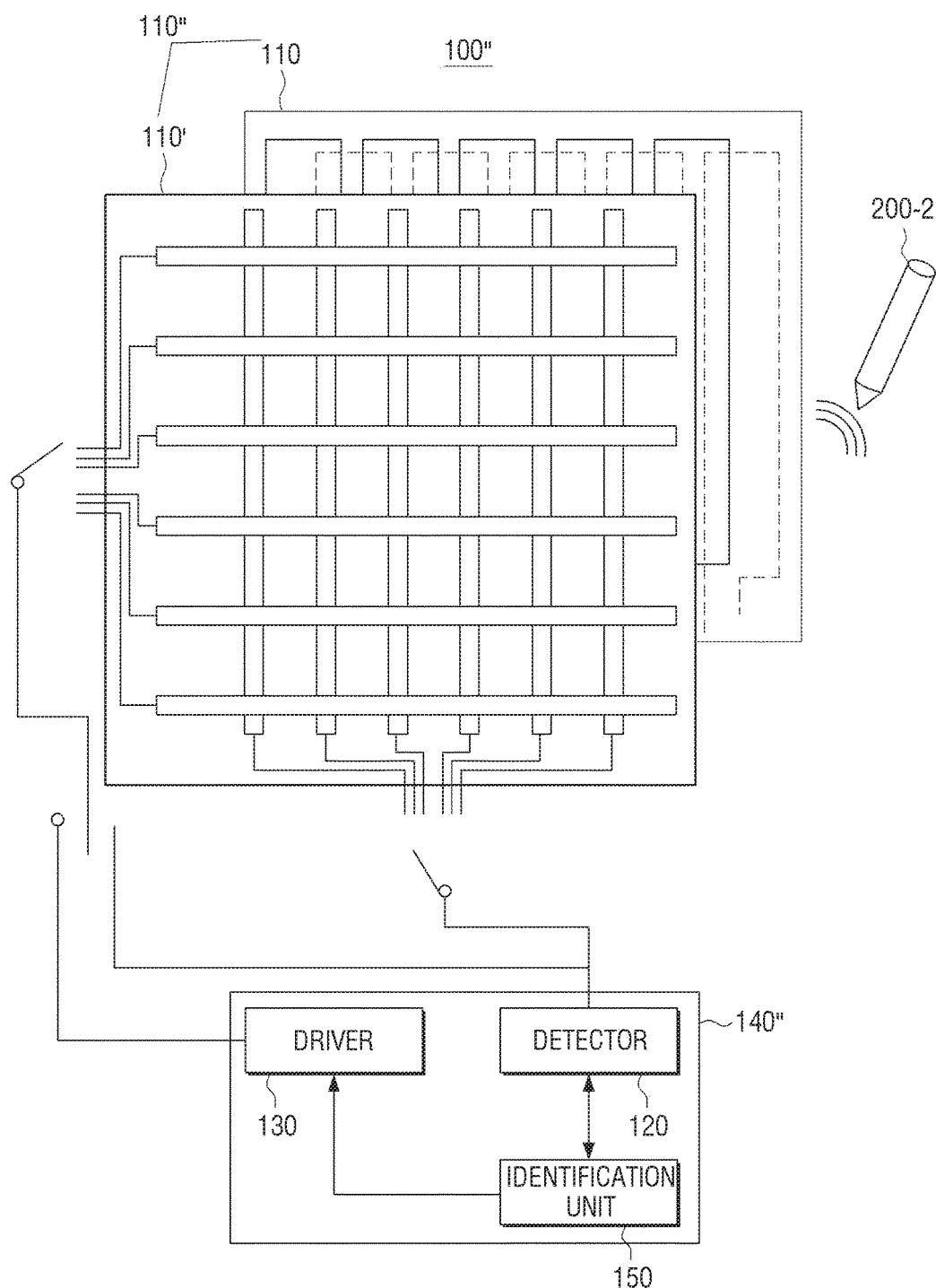
FIG. 4 is a circuit diagram illustrating a touch panel according to another embodiment of the present disclosure.

FIG. 4 is a diagram illustrating a circuit of a touch panel according to another embodiment of the present disclosure. For example, the touch panel according to another embodiment may be an example of a touch panel capable of further detecting a position of a passive type stylus pen. Referring to FIG. 4, a touch panel 100" may include a receiver 110" and a controller 140". The receiver 110" may include a plurality of antenna loops and a plurality of electrodes. For example, the receiver 110" may include two layers 110 and 110' overlapping each other. The plurality of antenna loops may be disposed in one layer and the plurality of electrodes may be disposed in the other layer. In this example, the receiver 110" has been illustrated with the antenna loop being disposed in an upper layer and the plurality of electrodes being disposed in a lower layer. However, the receiver 110" may be implemented that the arrangement order of two layers may be changed.

A configuration of a plurality of antenna loops 110 on a first layer 110 may be the same as that of the plurality of antenna loops in FIG. 3, and thus overlapping description thereof will be omitted.

A plurality of electrodes on a second layer 110' may include a plurality of first electrodes and a plurality of second electrodes. For example, as illustrated in FIG. 4, the receiver 110" may include a first electrode group and a second electrode group disposed to different direction from each other.

The first electrode group may include a plurality of electrodes disposed to the first direction (horizontal direction). The first electrode may be a transparent electrode, for example, indium tin oxide (ITO). The plurality of first electrodes in the first group may be electrodes for transmission which transmit certain driving signals (Tx signals) in response to a position of a finger being detected.

The second electrode group may include a plurality of second electrodes disposed to the second direction (vertical direction). The second electrode may be a transparent electrode, for example, ITO. The plurality of second electrodes in the second group may be electrodes for reception which receives Rx signals caused by the Tx signals input to the first electrodes in response to a position of a finger being detected.

The example has been illustrated in FIG. 4 with only six electrodes being included in one electrode group, but the receiver 110" may be implemented that five or less electrode or seven or more electrodes included in each electrode group. The example has been illustrated in FIG. 4 with the electrodes having a rectangular shape, but the receiver 110" may be implemented to have other shapes.

The controller 140" may identify a position of an object. For example, the controller 140" may include a detector 120, a driver 130, and an identification unit 150. The driver 130 may apply a driving signal to the receiver 110" at a preset point of time. For example, the driver 130 may apply the driving signal to the receiver 110" in the first scanning operation or in a second scanning operation for detecting a detailed position of a corresponding passive type stylus pen in response to the passive type stylus pen being is detected. The driving signal may be a sine wave signal having a predetermined resonant frequency.

The detector 120 may detect response signals each antenna loop and each electrode in the receiver 110". For example, the detector 120 may sequentially detect response signals all the antenna loops and all the electrodes in one channel units. In another example, the detector 120 may detect the response signals all the antenna loops and all the electrodes in units of a plurality of channels.

The detector 120 may variously perform signal-processing on the received response signals. For example, the detector 120 may amplify each response signal using an amplifier. The detector 120 may perform signal processing for extracting only information within a preset frequency from the received response signal.

The identification unit 150 may the type of an object based on a frequency band of a response signal of a stylus pen. For example, in the embodiment, the response signals having different frequencies may be generated from the stylus pens, and as illustrated in FIG. 15, the response signals having the different frequency bands according to the types of the stylus pens. In this example, the identification unit 150 may determine the type of stylus pen based on the frequency band of the detected response signal.

The identification unit 150 may control the detector to alternately perform a first scanning operation which determines a position of the stylus pen using all the response signals of the plurality of antenna loops and the plurality of electrodes and a second scanning operation which determines the position of the stylus pen using only response signals in a loop group (or electrode group) corresponding to the position-determined styles pen in the first scanning operation.

The first scanning operation may be a scanning operation which determines whether or not a new stylus pen which is not determined in a previous process is presented. Since the type and position of the new stylus pen is not determined, the identification unit 150 may apply the driving signal used for the passive type stylus pen and receive all the response signals of the electrodes to detect the positions of both the active type stylus pen and the passive type stylus pen with respect to all electrode regions.

For example, the identification unit 150 may control the driving signal to be emitted to the plurality of electrodes. The identification unit 150 may control the detector 120 to detect a response signal corresponding to the previously emitted driving signal from the plurality of electrodes.

For example, the identification unit 150 may control the driver 130 to simultaneously apply the same driving signal to all the first electrodes in a first time period, and control the detector 120 to detect a response signal of at least one electrode in a second time period after the application of the driving signal. The identification unit 150 may control the driver 130 to simultaneously apply the same driving signal to all the first electrodes again in a third time period, and control the detector 120 to detect a response signal of another electrode in a fourth time period after the application of the driving signal. The identification unit 150 may perform the first scanning operation by repeatedly performing the above-described process on all the electrodes. For example, since the receiver 110" of FIG. 4 incldes twelve electrodes, the controller 140 may alternately perform the operation of applying the driving signal and the operations of receiving the response signal twelve times. In response to response signals being detected in parallel in units of a plurality of channels through the detector 120, the number of the above-described repetitive processes may be reduced. For example, in response to the response signals being received in three channel units, the same operation in the detector 140 may be completed by performing the operation of applying the driving signal and the operation of receiving the response signal four times.

The second scanning operation may be a scanning operation which precisely determines change in the position of the stylus pen determined in a previous process. Since the position and type of the pre-detected stylus pen have been determined, the identification unit 150 may update the position of the existing stylus pen rapidly using only the response signal of the electrode corresponding to the pre-detected position through a manner corresponding to the corresponding type. In response to the predetermined stylus pen 200 being a passive type, the identification unit 150 may apply the driving signal to the receiver 110" before the response signal is received. The identification unit 150 may control the driver 130 to collectively apply the driving signal to all the electrodes in the receiver 110" or to apply the driving signal to only a partial electrode group including an electrode corresponding to the position of the stylus pen 200.

In response to the number of stylus pens determined through the second scanning operation being smaller than the number of predetermined stylus pen, the identification unit 150 may detect the position of the stylus pen by additionally using a response signal of another electrode group close to an electrode group which receives a response signal.

The second scanning operation may be performed in units of the type of the detected stylus pen. For example, in response to the pre-detected stylus pen being three active type stylus pens, the second scanning operation may be performed once in one type manner. In another example, in response to the pre-detected stylus pen being two active type stylus pens and one passive type stylus pen, the second scanning operation may be performed once in the active manner and may be performed once in a passive manner. As the type of stylus pen is diversified, a lot of time may be required to detect the positions of the plurality of stylus pens. However, in the embodiment, all positions according to the types of the stylus pens may not be detected, and only response signals of electrodes corresponding to the detected positions may be processed, and thus time delay may be reduced.

For example, the identification unit 150 may control the driver 130 and the detector 120 to perform position detection through the plurality of electrodes on the passive type stylus pen and to perform position detection through the plurality of antenna loops on the active stylus pen. In another example, the identification unit 150 may control the driver 130 and the detector 120 to perform only application of the driving signal through the plurality of electrodes and to perform the reception of the response signals through the plurality of antenna loops.

It has been described in FIG. 4 that the plurality of electrodes are disposed in a matrix form, but the plurality of electrodes may be implemented to be disposed in a form other than the matrix form.

It has been described in FIG. 4 that the antenna loop is inevitably included in the receiver 110", but the receiver 110" may be implemented to include only the plurality of electrodes without the use of the antenna loop.

It has been described in FIG. 4 that the plurality of electrodes are disposed over the antenna loops, but the receiver 110" may be implemented such that the antenna loops are disposed on the plurality of electrodes.

It has been described in FIG. 4 that the driver 130 and the detector 120 are included in the controller 140', but the controller 140' may be implemented with a separate configuration from the driver and the detector.

Figure 5:
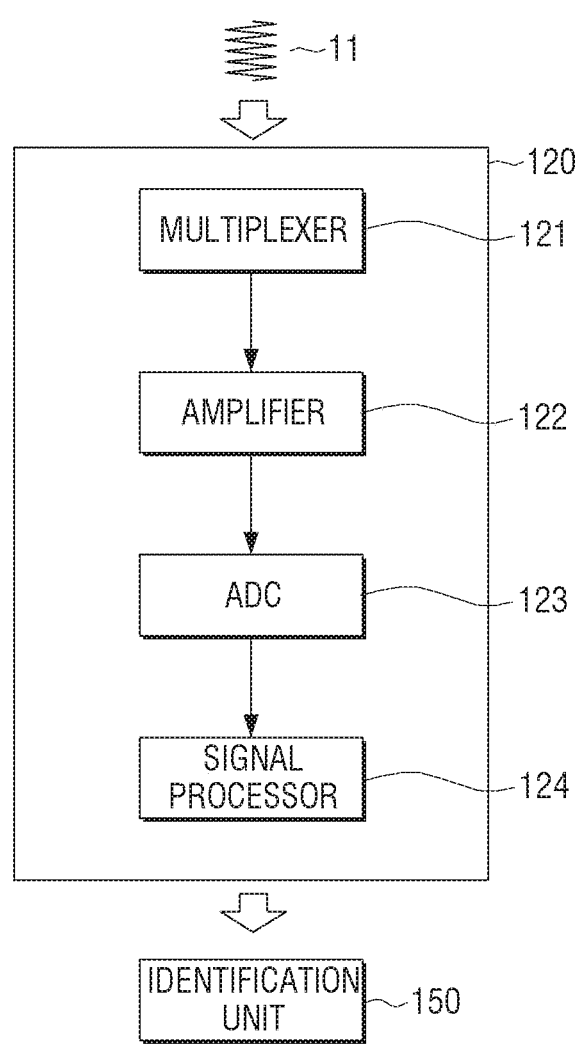
FIG. 5 is a diagram illustrating a configuration of a detector according to an embodiment of the present disclosure.

FIG. 5 is a diagram illustrating a configuration of a detector according to an embodiment of the present disclosure.

Referring to FIG. 5, the detector 120 may include a multiplexer 121, an amplifier 122, an analog to digital converter (ADC) 123, and a signal processor (or a digital signal processor (DSP)) 124.

The multiplexer 121 may be independently coupled to a plurality of antenna loops, and may couple one of the plurality of antenna loops to the amplifier 122 to be described below. For example, the multiplexer 121 may transfer a response signal 11 of a specific antenna loop to the amplifier 122. The multiplexer 121 may perform the above-described transferring operation to another antenna loop in preset time order units.

The amplifier 122 may amplify the response signal 11 transferred from the multiplexer 121 and output the amplified response signal.

The ADC 123 may convert the amplified response signal to a digital signal.

The signal processor 124 may extract a signal having a preset frequency band from the response signal converted to the digital signal. For example, the signal processor 124 may extract only a frequency component (for example, 200 kHz to 700 kHz in FIG. 11) corresponding to a frequency range of a response signal provided from the stylus pen 200. The signal processor 124 may provide the frequency components included in the response signals converted in the digital signals and a magnitude and phase of each frequency component to the controller 140.

In the embodiment, the detector 120 may determine the position of the pen by extracting only the preset frequency component, and reception sensitivity of the response signal may be improved by removing a noise component other than the preset frequency.

The detector 120 includes one amplifier 122 in FIG. 5, and the detector 120 has to perform repetitive signal processing according to the number of a plurality of antenna loops to process the response signals of the plurality of antenna loops. Accordingly, the detector 120 may be implemented to include a plurality of amplifiers, a plurality of ADCs, and a plurality of signal processors to reduce the processing time as illustrated in FIG. 6.

Figure 6:
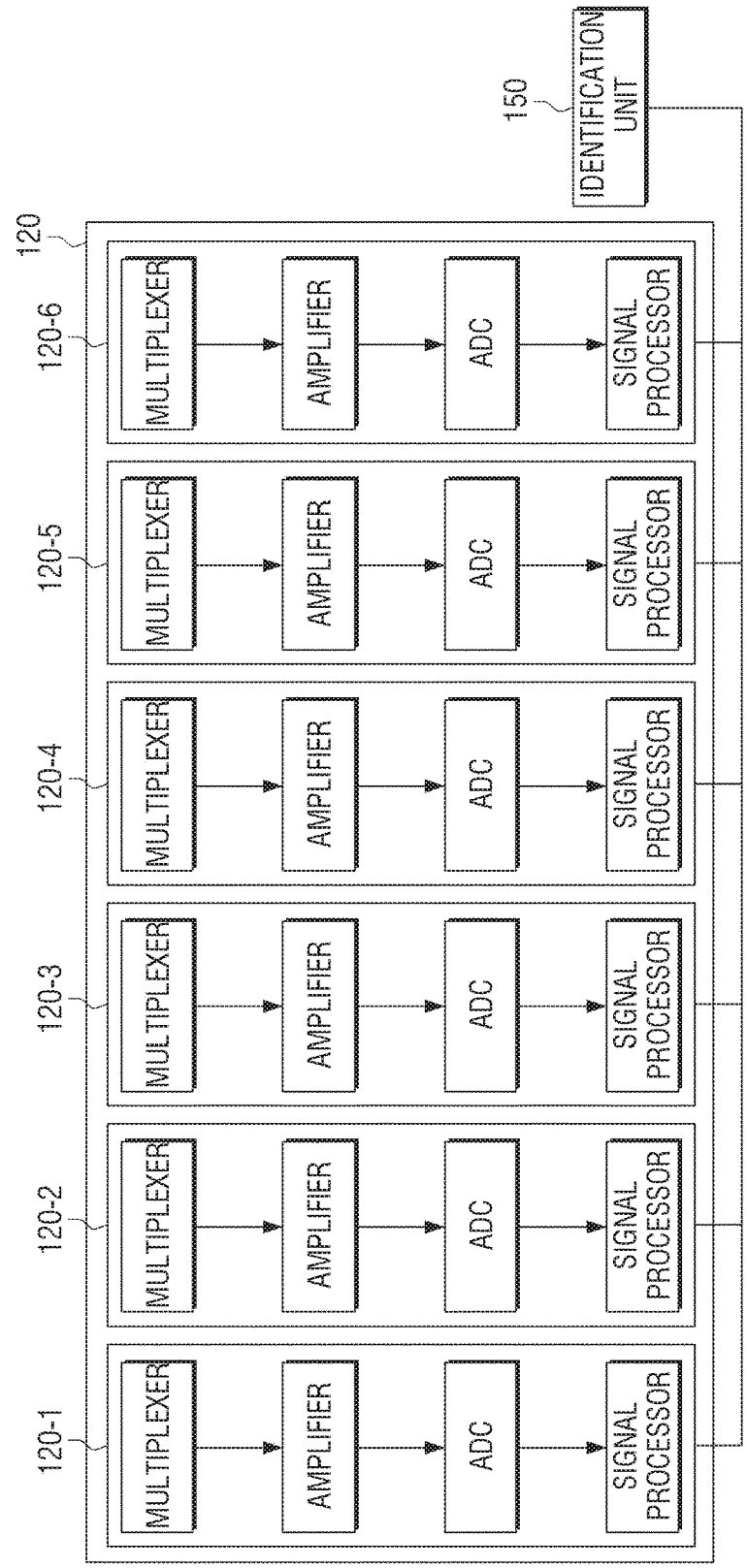
FIG. 6 is a diagram illustrating a configuration of a detector according to another embodiment of the present disclosure.

FIG. 6 is a diagram illustrating a configuration of a detector according to another embodiment of the present disclosure. A detector 120' according to another embodiment may be an example of a detector which may improve sensing speed through the plurality of amplifiers, the plurality of ADCs, and the plurality of signal processors.

Referring to FIG. 6, the detector 120' may have a configuration which includes a plurality of detectors 120-1, 120-2, 120-3, 120-4, 120-5, and 120-6 as illustrated in FIG. 5. For example, the detector 120' may be configured of the plurality of amplifiers, the plurality of ADCs, and the plurality of signal processors. It has been illustrated in FIG. 6 that the multiplexer is included in the detector 120', but the multiplexer may not be separately used in response to the number of amplifiers corresponding to the number of antenna loops.

The plurality of amplifiers may amplify the response signals transferred from the plurality of antenna loops in parallel and output the amplified signals. In FIG. 6, the detector 120' may process the response signals in six channel units.

The plurality of ADCs may convert the response signals amplified in the plurality of amplifiers to digital signals.

The plurality of signal processors may extract preset frequency components from the response signals converted in the digital signals through the plurality of ADCs.

In the embodiment, the detector 120' may process the response signals in parallel in six channel units to improve the processing speed. For example, the processing speed may be 6 times faster than that in FIG. 5. The detector 120' in FIG. 6 may be implemented to be operated in six channel units, but the detector 120' may be implemented to be operated in two to five channel units or in seven or more channel units.

The detector 120' of FIG. 6 may extract the frequency components from the digital response signals using the plurality of signal processors, but the detector 120' may be implemented to receive the response signals converted to the digital signals through the plurality of ADCs and extract the preset frequency components of the plurality of response signals through one signal processor.

Figure 7A:
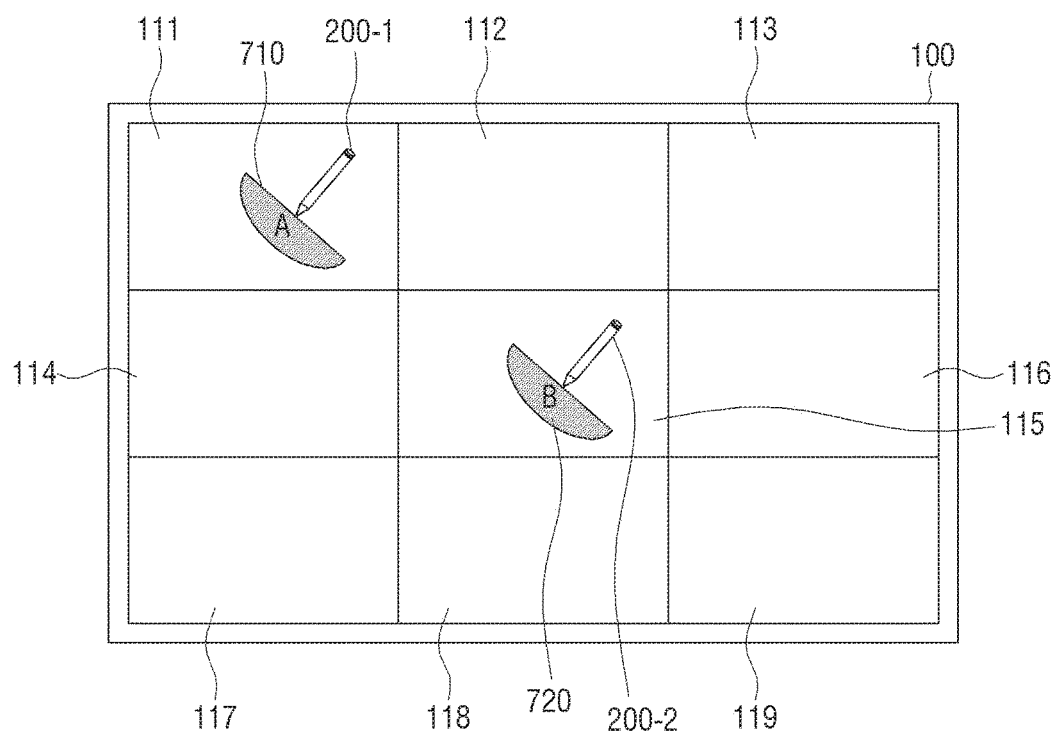
FIGS. 7A, 7B, and 7C are diagrams illustrating an operation in an electronic white board according to an embodiment of the present disclosure.
Figure 7B:
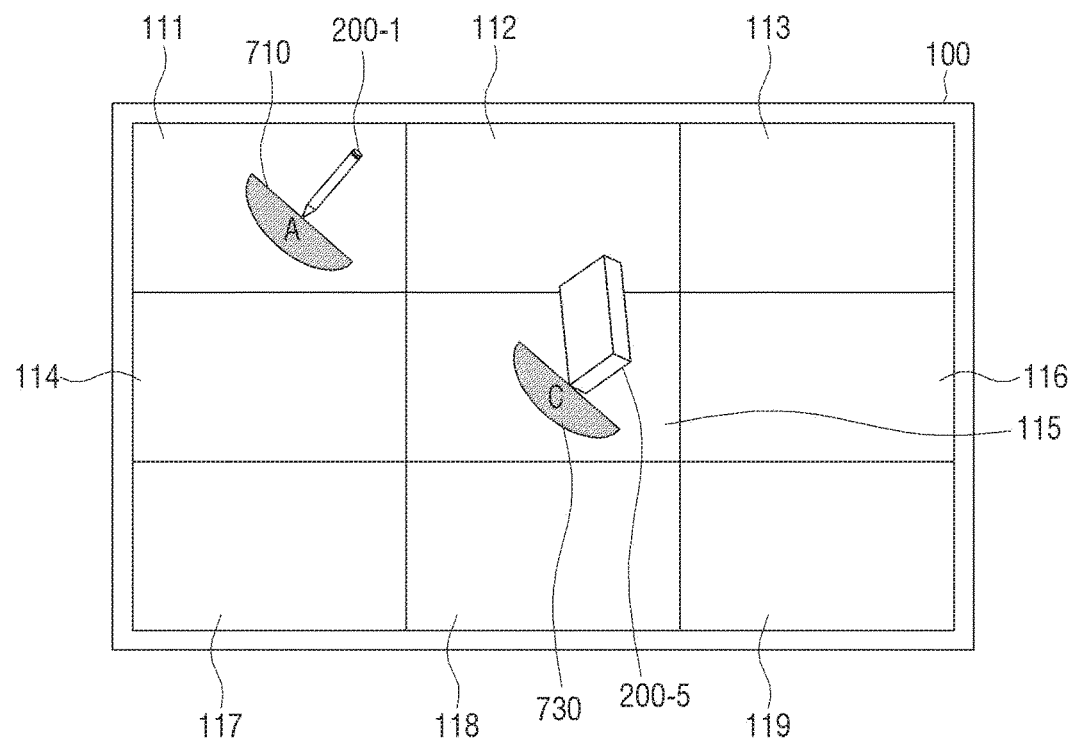
Figure 7C:
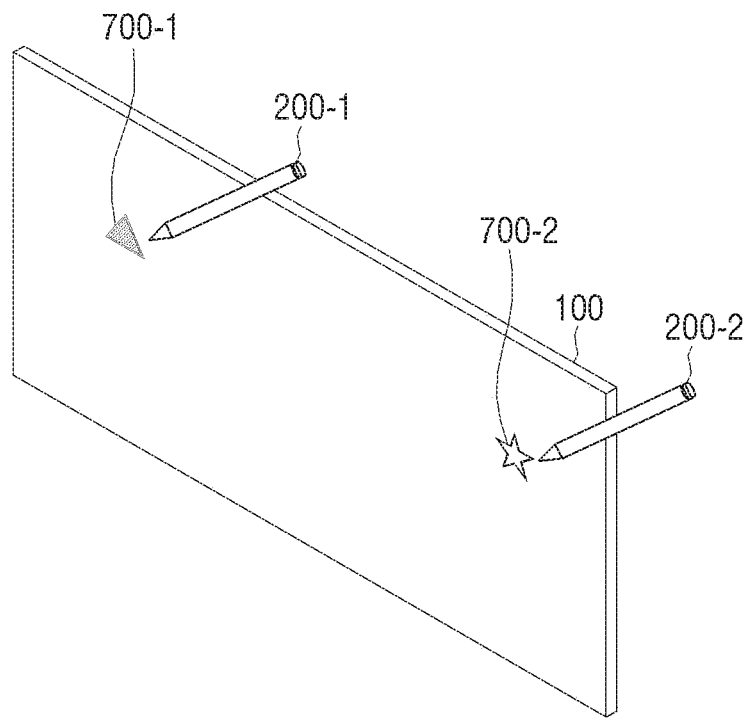

FIGS. 7A to 7C are diagrams illustrating an operation in an electronic white board according to an embodiment of the present disclosure. For example, FIG. 7A is a diagram illustrating an operation in response to a plurality of stylus pens being used in an electronic white board.

Referring to FIG. 7A, the touch panel 100 may be partitioned into a plurality of regions 111, 112, 113, 114, 115, 116, 117, 118, and 119. A first stylus pen 200-1 may be located on a first region 111, and the second stylus pen 200-2 may be located on a fifth region 115.

The first stylus pen 200-1 and the second stylus pen 200-2 may provide response signals having different frequencies to the touch panel 100. The touch panel 100 may identify the first stylus pen 200-1 as a stylus pen on the first region 111, and the second stylus pen 200-2 as a stylus pen on the fifth region 115.

In response to a menu being selected by a user A using the first stylus pen 200-1 in this state, the touch panel 100 may display an A menu 710 specialized to the user A close to a current position of the first stylus pen 200-1. The A menu 710 may be any one selected by the user A in advance among various menu options which may be set to the stylus pen such as a pen thickness and color. In response to only the pen thickness being previously selected by the user A, the menu 710 may display only a menu for receiving selection for the pen thickness.

In response to a menu being selected by a user B using the second stylus pen 200-2, the touch panel 100 may display a B menu 720 specialized to the user B close to a current position of the second stylus pen 200-2. The B menu 720 may be any one selected by the user B in advance among various menu options which may be set to the stylus pen. In response to the menu option being not previously selected by the user B, the menu 720 may display a menu predetermined as default.

The electronic white board may simultaneously display menus with response to stylus pens, and thus the user may bring and use a menu screen without stand-by while another user uses the menu. The displayed menu may be specialized to the user (or a type of a corresponding object), and the user may select the menu more conveniently.

The menu for each stylus pen may be displayed close to each pen, and the user may select a desired menu more conveniently. A menu specialized only to the user, and thus the user convenience may be further improved.

FIG. 7B is a diagram illustrating an operation in response to one stylus pen and one eraser being used in an electronic white board.

Referring to FIG. 7B, the touch panel 100 may be partitioned into a plurality of regions 111, 112, 113, 114, 115, 116, 117, 118, and 119. A first stylus pen 200-1 may be located on a first region 111, and an eraser object 200-5 may be located on a fifth region 115.

The first stylus pen 200-1 and the eraser object 200-5 may provide response signals having different frequencies to the touch panel 100. The touch panel 100 may identify the first stylus pen 200-1 as an object on the first region 111, and the eraser object 200-5 as an object on the fifth region 115.

In response to a menu being selected by a user A using the first stylus pen 200-1, the touch panel 100 may display an A menu 710 specialized to the user A. The A menu 710 may be any one selected by the user A in advance among various menu options which may be set to the stylus pen such as a pen thickness, color, and class material readout. In response to only the class material readout being previously selected by the user A, the A menu 710 may display only a menu for receiving selection for the class material readout.

In response to a menu being selected by a user C using the eraser object 200-5, the touch panel 100 may display a C menu 730 specialized to the user C. The C menu 730 may be any one selected by the user C in advance among various menu options which may be set to the eraser object such as an edit command, an eraser manner, and an erasing region size. In response to only the erasing region size being previously selected by the user C, the C menu 730 may display only a menu for the selection of the erasing region size.

FIG. 7C is a diagram illustrating an operation in response to a writable stylus pen being used on an electronic white board.

Figure 19:
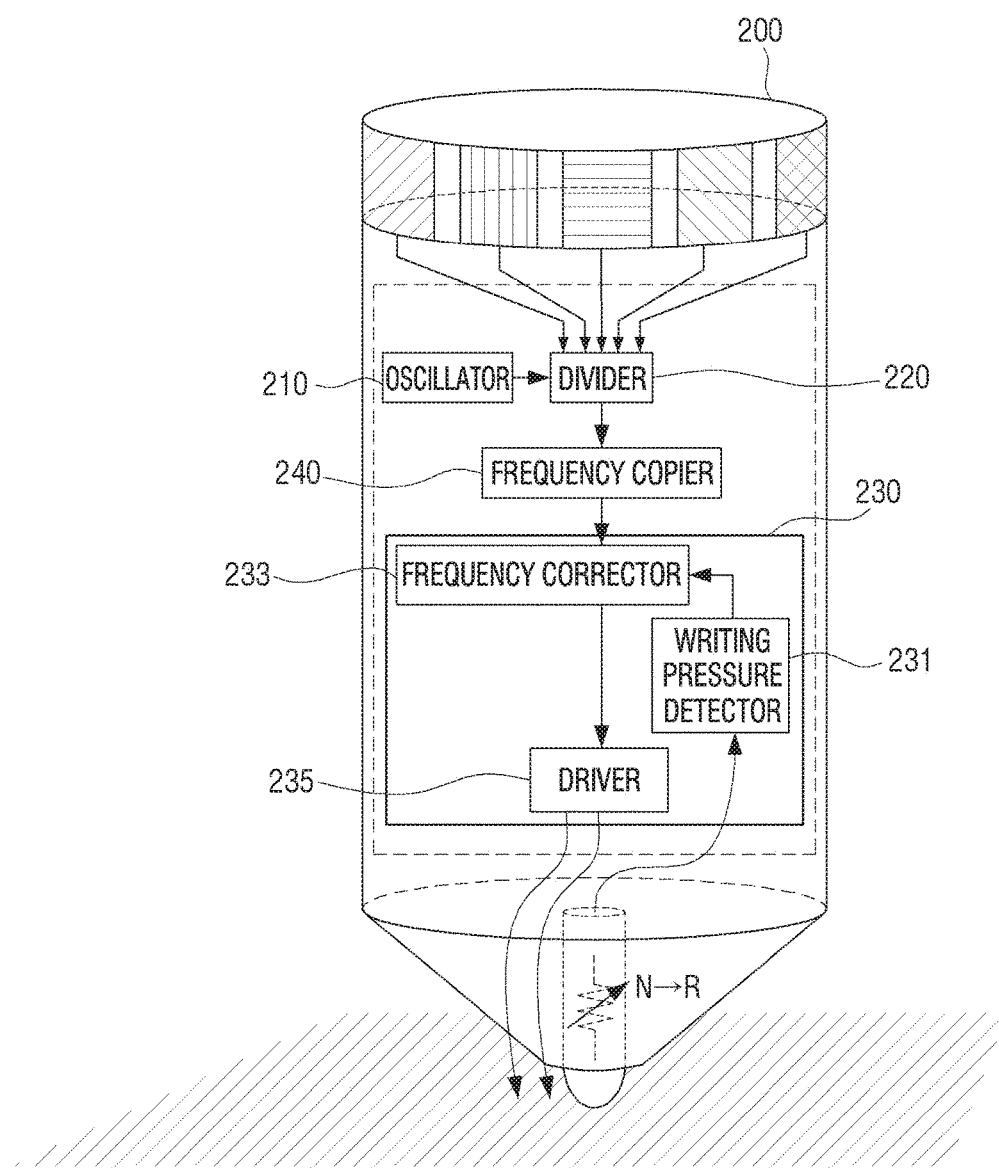
FIG. 19 is a diagram illustrating an operation of a stylus pen according to an embodiment of the present disclosure.
Figure 22:
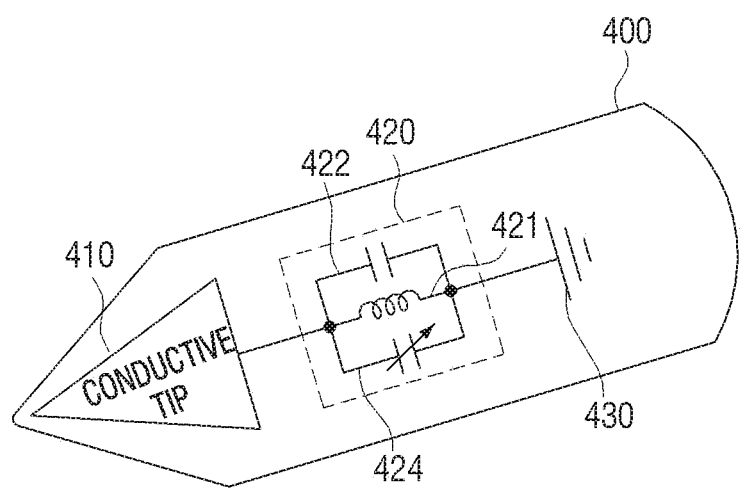
FIG. 22 is a circuit diagram illustrating a stylus pen according to another embodiment of the present disclosure.

The stylus pen according to the embodiment may be implemented with a board maker. For example, a nib of a stylus pen as illustrated in FIG. 19 or 22 may be configured of an aqueous maker or a circuit configuration as illustrated in FIG. 19 or 22 may be added to a general board maker. In this example, the user may perform actual writing on a tempered glass surface of an electronic white board, and a trace and storage for a moving path of the board maker may be stored like a stylus pen of the related art.

Accordingly, a teacher may perform writing in an environment such as a classroom using the stylus pen like the board maker. The moving path of the board maker may be traced like the general stylus pen, and the traced moving path may be electronically stored and provided to students. In the embodiment, the response signals having different frequencies from the stylus pens. For example, contents 700-1 created through a stylus pen 200-1 designated to black may be transferred together with information that the writing contents 700-1 is black, and contents 700-2 created through a stylus pen 200-2 designated to red may be transferred together with information that the writing contents 700-2 is red.

Figure 8B:
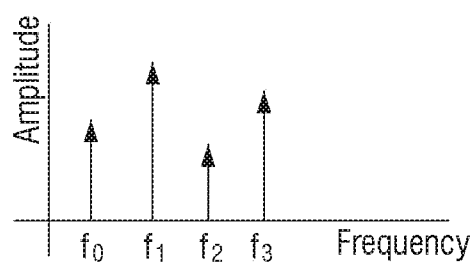
Figure 8C:
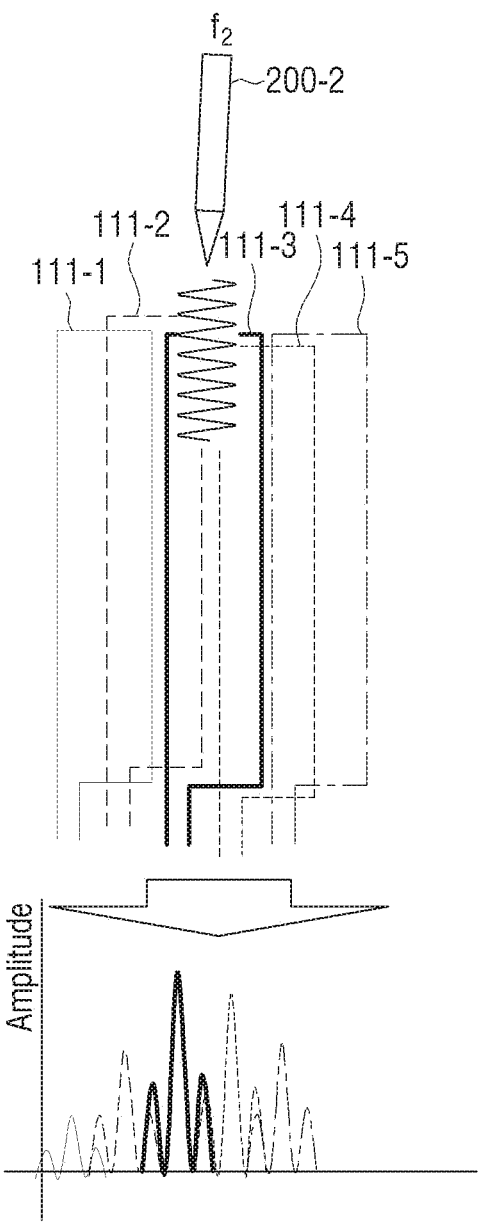

FIGS. 8A to 8C are diagrams illustrating an operation in one antenna loop according to an embodiment of the present disclosure. For example, FIG. 8A is a schematic diagram illustrating an operation of receiving response signals of a plurality of stylus pens in one antenna loop, and FIG. 8B is a diagram illustrating frequency characteristics of response signals received from a plurality of stylus pens. FIG. 8C is a diagram illustrating an operation of a plurality of antenna loops and one stylus pen.

Referring to FIGS. 8A and 8B, a touch panel 100' may include a plurality of antenna loops. At least one antenna loop 111 among the plurality of antenna loops may receive four different response signals from a plurality of stylus pens 200-1, 200-2, 200-3, and 200-4.

Frequency components of the response signals received in one antenna loop 111 and magnitudes of the frequency components may be detected through the configuration of the detector illustrated in FIG. 5 or 6. The received response signal may be a response signal in a passive manner or a response signal in an active manner. In this regard, the plurality of response signals may be a plurality of response signal in the active manner or a plurality of response signals in which response signals in the passive manner and response signals in the active manner are mixed.

For example, in response to the plurality of response signals received from the plurality of stylus pens having the same frequency, the touch panel 100' may not distinguish (or identify) apparatuses. In this regard, the stylus pens 200-1, 200-2, 200-3, and 200-4 in the embodiment may transmit response signals having different frequencies from each other to the touch panel 100'. Accordingly, as illustrated in FIG. 8B, the plurality of response signals may have frequencies having different center frequencies from each other.

The response signals received from the stylus pens 200-1, 200-2, 200-3, and 200-4 may have different frequencies, and the number of response signals included in the received signal and magnitudes of the response signals may be determined through frequency component analysis included in the received signal.

A position of a stylus pen corresponding to a corresponding frequency may be determined based on a magnitude for a specific frequency component in the plurality of antenna loops. This operation will be described with reference to FIGS. 8C and 9 below.

Referring to FIG. 8C, a plurality of antenna loops 111-1, 111-2, 111-3, 111-4, and 111-5 may be consecutively disposed in an overlapping manner to each other. In response to the plurality of antenna loops 111-1 to 111-5 being coupled to the detector 120 as illustrated in FIG. 5, the detector 120 may simultaneously measure a result value of the antenna loop 111-3 in which a current stylus pen 200-2 is located as well as result values of the antenna loops 111-1, 111-2, 111-4, and 111-5 around the corresponding antenna loop 111-3. Accordingly, in response to the stylus pen 200-2 being determined, the touch panel 100 may rapidly determine positions of the stylus pens at a point of time when coordinates of next period are measured not using values of all the antenna loops but using values of partial antenna loops.

Figure 9:
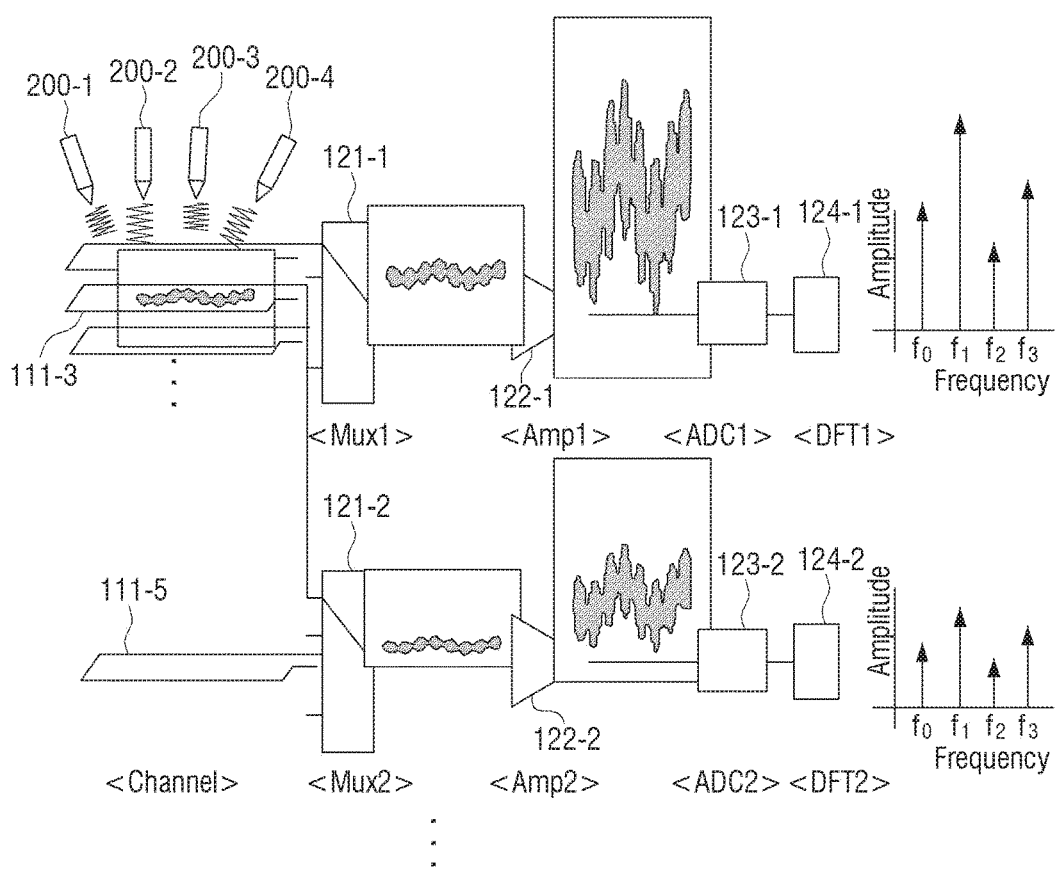
FIG. 9 is a diagram illustrating operations of a plurality of antennas and a plurality of stylus pens according to an embodiment of the present disclosure.

FIG. 9 is a diagram illustrating an operation of a plurality of antenna loops and a plurality of stylus pens according to an embodiment of the present disclosure.

Referring to FIG. 9, in response to a plurality of stylus pens 200-1, 200-2, 200-3, and 200-4 being located on the touch panel 100, response signals may be received from the plurality of stylus pens 200-1 to 200-4 in each antenna loop. The touch panel 100 may receive the response signals in units of a plurality of channels. For example, a first multiplexer 121-1 may receive the response signals of the plurality of stylus pens 200-1 to 200-4 from a third antenna loop 111-3 among the plurality of antenna loops coupled to the first multiplexer 121-1. An amplifier 122-1 may amplify the plurality of response signals received from the third antenna loop 111-3, an ADC 123-1 may convert the amplified response signals of the third antenna loop 111-3 to digital signals, and a signal processor 124-1 may output magnitude values for four frequency components as illustrated in the right of FIG. 9.

A second multiplexer 121-2 may receive the response signals of the plurality of stylus pens 200-1 to 200-4 from a fifth antenna loop 111-5 among the plurality of antenna loops coupled to the second multiplexer 121-2. An amplifier 122-2 may amplify the plurality of response signals received from the fifth antenna loop 111-5, an ADC 123-2 may convert the amplified response signals of the fifth antenna loop 111-5 to digital signals, and a signal processor 124-2 may output magnitude values for four frequency components as illustrated in the right of FIG. 9.

In this example, the controller 140 may determine a position of a stylus pen corresponding to a corresponding frequency component based on magnitudes of the antenna loops having the same frequency component. For example, in response to a response frequency of the first stylus pen 200-1 being f0 and the magnitude value in the third antenna loop being the largest value, the stylus pen may be determined to be disposed over the third antenna loop.

Figure 10:
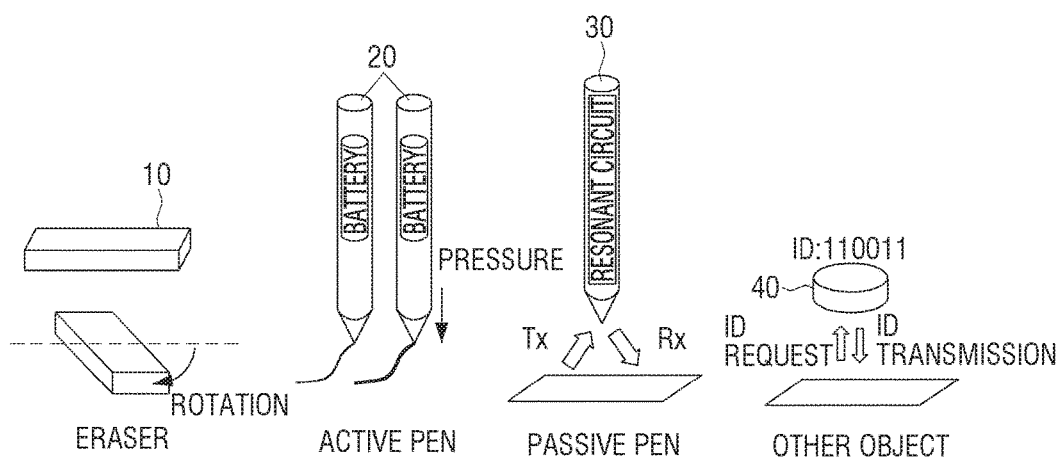
FIG. 10 is a diagram illustrating an example for various types of the objects according to an embodiment of the present disclosure.

FIG. 10 is a diagram illustrating an example of various stylus pens according to an embodiment of the present disclosure.

Referring to FIG. 10, the touch panel 100 may detect various objects 10, 20, 30, and 40. A frequency range and characteristic of the objects 10, 20, 30, and 40 are illustrated in FIGS. 11 and 12. The first object 10 may be an eraser type object having a resonant circuit. The second object 20 may be a stylus pen operated in an active manner. The third object 30 may be a stylus pen operated in a passive manner. The fourth object 40 may be a resonant circuit and object capable of emitting an ID signal.

The touch panel 100 may identify the type of stylus pens on a current touch panel according to a frequency band in the detected response signal. For example, in response to Tx and ID signals being not presented in a response signal and a response signal in 200 to 300 kHz frequency band being received, a corresponding stylus pen may be determined as an active type stylus pen.

FIG. 11 illustrates different frequency ranges according to the type of apparatus, but the embodiment is not limited to a corresponding frequency range according to an embodiment of the present disclosure.

FIG. 12 is a diagram illustrating characteristics of various types of the objects according to an embodiment of the present disclosure.

Figure 13:
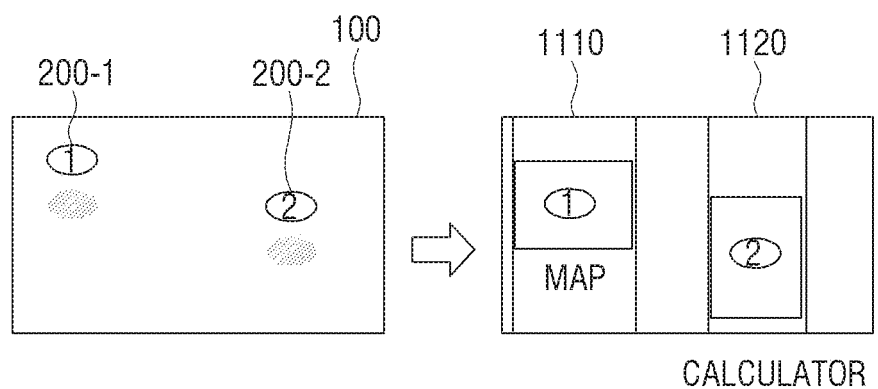
FIG. 13 is a diagram illustrating an operation of a touch panel according to another embodiment of the present disclosure.

FIG. 13 is a diagram illustrating an operation of a touch panel according to another embodiment of the present disclosure.

Referring to FIG. 13, the touch panel 100 may determine positions of different types of the stylus pens. It is assumed that a first stylus pen 200-1 may be an active type stylus pen, and a second stylus pen 200-2 may be a passive type stylus pen. The active type stylus pen 200-1 and the passive type stylus pen 200-2 may have a difference in that the passive type stylus pen may be operated with a driving signal, and the active type stylus pen may be operated without the driving signal.

The touch panel 100 may not know whether a stylus pen located at the periphery thereof is an active type or a passive type, and the touch panel 100 may perform a first scanning method for first determining whether which type of the stylus pen 200 is located. For example, to further detect the passive type stylus pen, the touch panel 100 may provide a driving signal to antennal loops, and receive response signals from all the antenna loops. The first scanning method will be described in detail with reference to FIG. 14 further below.

In response to the detecting operation being repeatedly performed on all the antenna loops in the touch panel, the response signals have to be received from all the antenna loops, and thus a lot of time may be required for processing. In general, next position of the stylus pen is more likely to be located in a previous position or around a current position. A method of processing only a response signal corresponding to the previous position may have a larger processing rate and lower power consumption than a method of processing response signals of all the antenna loop positions.

Accordingly, the touch panel 100 may determine the position of the first stylus pen 200-1 using only a response signal received in an antenna loop of a loop group 1110 around the first position. This operation will be described with reference to FIG. 15 further below.

In response to the position determination for the first stylus pen 200-1 being completed, the touch panel 100 may cause the driving signal to be applied to a loop group 1120 around a second position, and determine a position of the second stylus pen 200-2 using only a response signal received from the loop group 1120. This operation will be described with reference to FIG. 16 further below.

It has been described that the second scanning method may be performed at different points of time according to the types of the stylus pens. However, the antenna loops corresponding to positions of the different types of the stylus pens being different from each other as illustrated in FIG. 13, the operations for determining positions may be simultaneously performed. That is, an operation of receiving only the response signal with respect to the loop group 1110 may be simultaneously performed together with an operation for applying the driving signal and receiving the response signal with response to the loop group 1120.

Figure 14:
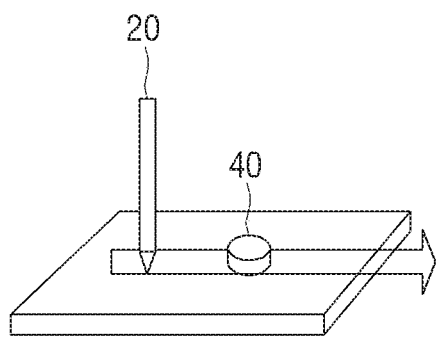
FIG. 14 is a diagram illustrating an operation example of a first scanning method according to an embodiment of the present disclosure.

FIG. 14 is a diagram illustrating an operation example of a first scanning operation according to an embodiment of the present disclosure. It is assumed that a first stylus pen 20 may be an active type stylus pen, and a second stylus pen 40 may be an object communicable with the touch panel 100 with a digital code.

Referring to FIG. 14, the touch panel 100 may not know a position of a stylus pen and the type of the stylus pen, and thus the touch panel 100 may perform scanning all the antenna loops. For example, to further detect the passive type stylus pen, the touch panel 100 may provide a driving signal to antennal loops, and receive response signals from all the antenna loops. In response to the first stylus pen 20 being detected in a first position and the second stylus pen 40 being detected in a second position through the above-described process, the touch panel 100 may perform the second scanning method based on the detected positions. This operation will be described with reference to FIGS. 15 and 16 below.

The first scanning method may be performed in preset period units (that is a period longer than that in the second scanning method) or may be performed in response to a position of an existing object being not determined through the second scanning method.

FIG. 15 is a diagram illustrating an operation example of a second scanning method for a first stylus pen according to an embodiment of the present disclosure.

Referring to FIG. 15, a previous position of the first stylus pen 20 has been determined through the first scanning method. As described above, the current position of the first stylus pen 20 is more likely to be the same as the previously determined position or to be close to the previously determined position. Accordingly, the touch panel 100 may detect the position of the first stylus pen 20 using only the response signal received from the antenna loop in the loop group 1110 around the first position.

In response to the first stylus pen 20 being a passive type, an operation of applying the driving signal may be performed before the response signal is received as described above.

In response to the position of the stylus pen 20 in the antenna loop in the loop group 1110 around the first position being not detected, the touch panel 100 may repeatedly perform the above-described second scanning method on another loop group 1120 around the loop group 1110. The touch panel 100 may be implemented to return to the first scanning method in response to the detected existing object being not detected through the second scanning method.

Figure 16:
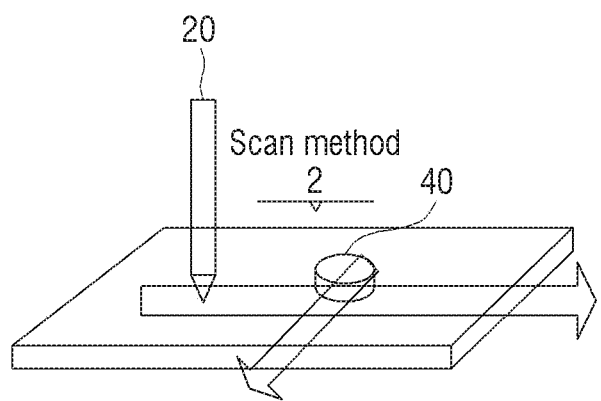
FIG. 16 is a diagram illustrating a second scanning method for a second stylus pen according to an embodiment of the present disclosure.

FIG. 16 is a diagram illustrating a second scanning method for a second stylus pen according to an embodiment of the present disclosure.

Referring to FIG. 16, a previous position of the second stylus pen 40 has been determined through the first scanning method. As described above, the current position of the second stylus pen 40 is more likely to be the same as the previously determined position or to be close to the previously determined position. Accordingly, the touch panel 100 may detect the position of the second stylus pen 40 using only the response signal received from the antenna loop of the loop group 1110, in which the first stylus pen has been previously located, around the second position.

Figure 17:
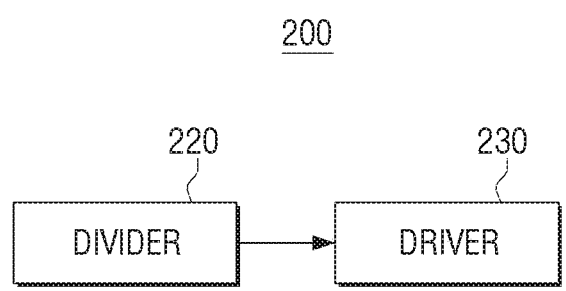
FIG. 17 is a block diagram illustrating a stylus pen according to an embodiment of the present disclosure.

FIG. 17 is a block diagram illustrating a stylus pen according to an embodiment of the present disclosure.

Referring to FIG. 17, a stylus pen 200 may be configured of a divider 220 and a driver 230. The stylus pen 200 may be an active type stylus pen operated with its own power.

The divider 220 may divide a preset frequency. For example, the frequency generated from the oscillator 210 may be high frequency in detecting the touch panel 100, and the divider 220 may divide the frequency generated from the oscillator 210. The oscillator 210 may be configured to generate the preset frequency using a crystal oscillator. The divider 220 may divide the generated frequency by a division ratio corresponding to an operation state selected by the user. The operation state may be a color state of the stylus pen, an eraser state, and the like. For example, in response to the stylus pen being yellow, the divider 220 may divide the generated frequency by 101 times and in response to the stylus pen being red, the divider 220 may divide the generated frequency by 100 times.

The driver 230 may generate a response signal having the divided frequency and transfer the generated response signal to an antenna loop in the touch panel 100. For example, the driver 230 may vary the divided frequency based on a resistance value varied according to pressure of a tip, and generate a response signal having the varied frequency.

In the embodiment, the stylus pen 200 may generate the response signal by dividing the frequency generated in the oscillator, and the stylus pen 200 may support various operation modes and detect fine writing pressure. The stylus pen 200 may use a crystal vibrator, and may not need to tune the frequency generated in the stylus pen in the manufacturing process of the stylus pen, and change in the temperature is slightly.

Figure 18:
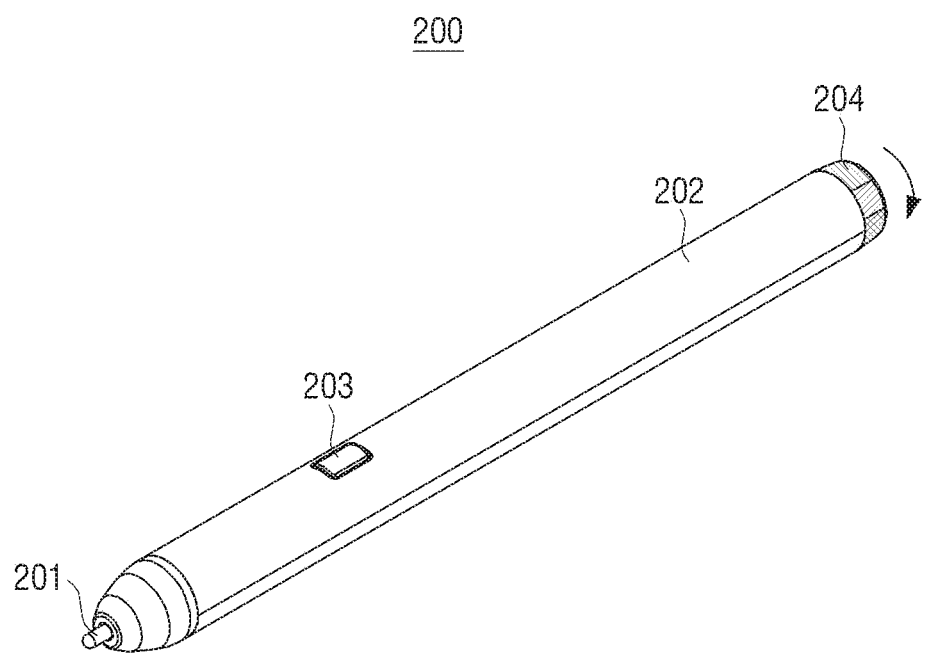
FIG. 18 is a perspective view illustrating a stylus pen according to an embodiment of the present disclosure.

FIG. 18 is a perspective view illustrating a stylus pen according to an embodiment of the present disclosure.

Referring to FIG. 18, the stylus pen 200 may be mounted with a switch 203 in an outer surface 202 to be operated by the user. A tip 201 of which a resistance value is varied by pressure may be disposed in a front portion, and a selector 204 for receiving selection for various operation modes of the stylus pen 200 may be mounted on a rear portion of the stylus pen. The user may change an operation mode (for example, color) of the stylus pen 200 through the selector 204.

Figure 20:
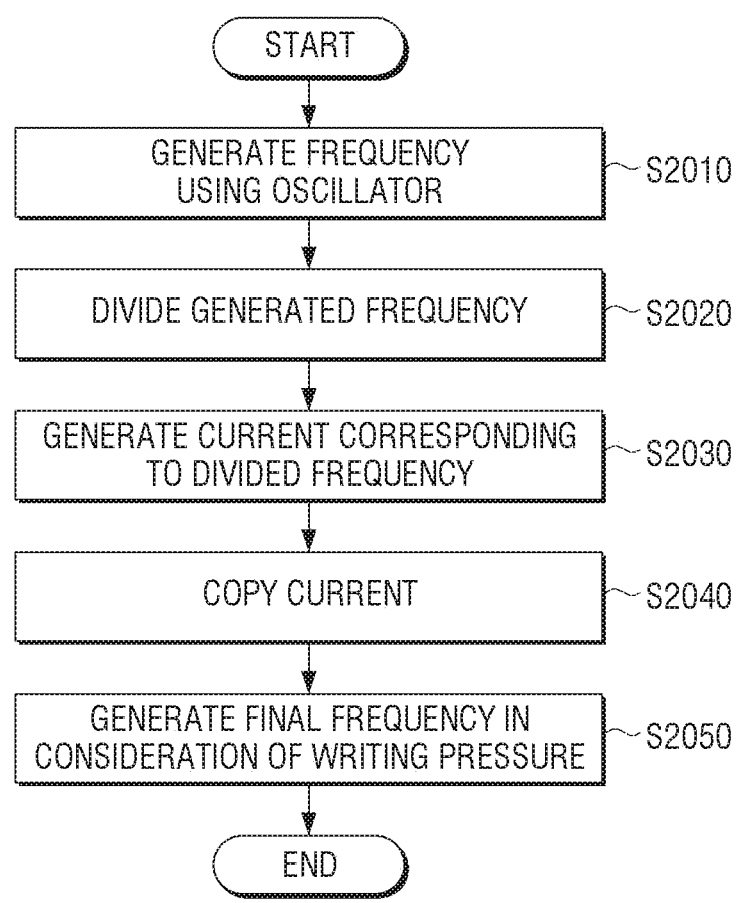
FIG. 20 is a flowchart illustrating an operation of a stylus pen according to an embodiment of the present disclosure.

FIG. 19 is a diagram illustrating an operation of a stylus pen according to an embodiment of the present disclosure. FIG. 20 is a flowchart illustrating an operation of a stylus pen according to an embodiment of the present disclosure.

Referring to FIGS. 19 and 20, the oscillator 210 may generate a preset frequency using a crystal oscillator at operation S2010. The frequency generation operation may be performed in an initial operation of the stylus pen 200, and the frequency generation operation of the oscillator 210 may be terminated after a certain time elapsed. The oscillator 210 may include a crystal oscillator, and may generate the preset frequency using the oscillator. The crystal oscillator may be an oscillator which uses a mechanical resonance caused in vibration of crystal of piezoelectric material and may generate frequency in a range of several hundred kHz to several tens of Mhz.

The divider 220 may divide the frequency generated in the oscillator 210 by a division ratio corresponding to a color mode selected by the user through the selector at operation S2020. An initial current Is1 corresponding to the divided frequency may flow through the frequency copier 240 at operations S2030 and S2040. In response to the initial current Is1 being flowing, the circuit may have a negative feedback loop, and the divided frequency value may be fixed without the frequency value of the oscillator 210. The stylus pen 200 may stop the operation of the oscillator 210 and reduce power consumption thereof.

The divider 220 may generate an output frequency to which writing pressure is reflected using an oscillation frequency stored in the circuit at operation S2050. For example, a writing pressure detector 231 may detect writing pressure using the tip 201 of which a resistance value is changed according to the writing pressure of the stylus pen. A frequency corrector 233 may generate a response frequency by varying the previously divided frequency according to the detected writing pressure. The driver 235 may generate a response signal corresponding to the generated response frequency.

Figure 21:
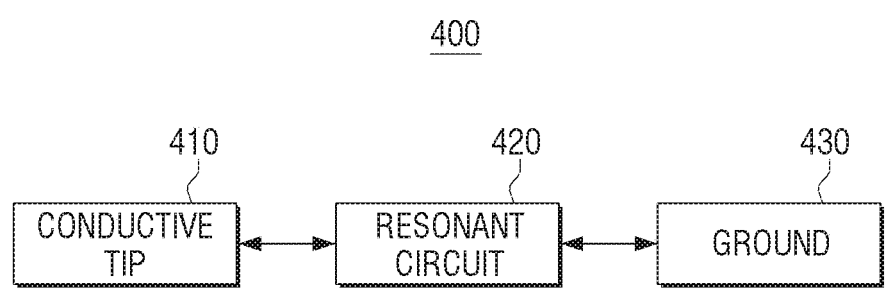
FIG. 21 is a block diagram illustrating a stylus pen according to another embodiment of the present disclosure.

FIG. 21 is a block diagram illustrating a stylus pen according to another embodiment of the present disclosure.

Referring to FIG. 21, a stylus pen 400 may be configured of a conductive tip 410, a resonant circuit 420, and a ground 430. The stylus pen 400 may be a passive type stylus pen operated through a driving signal provided from the touch panel 100.

The conductive tip 410 may form a capacitor with at least one of a plurality of electrodes in the touch panel 100. The conductive tip 410 may be formed of, for example, a metallic tip. The conductive tip 410 may be presented inside a non-conductive material or a portion of the conductive tip 410 may be exposed to the outside. The stylus pen 400 may further include an insulator which prevents the conductive chip 410 from being in direct contact with the external object so as to smooth a writing sense in using of the stylus pen.

The resonant circuit 420 may include a parallel resonant circuit configured of an inductor coupled to the conductive tip 410 and a capacitor.

The resonant circuit 420 may receive energy for resonance through capacitive coupling between at least one electrode in the touch panel and the conductive chip. For example, the resonant circuit 420 may be resonated with the driving signal input from the touch panel 100. The resonant circuit 420 may output a resonance signal (that is, response signal) by resonance even after the input of the driving signal is interrupted. For example, the response signal output from the resonant circuit 420 may be a sine wave signal having a resonant frequency of the resonant circuit.

The resonant circuit 420 may vary the resonant frequency by varying a capacitance of the capacitor according to contact pressure of the conductive tip 410. This operation will be described with reference to FIG. 23 further below.

The resonant circuit 420 may vary the resonant frequency by varying a capacitance of the capacitor or inductance of the inductor according to an operation of the user.

The resonant circuit 420 may have a tuning cap for having a preset resonant frequency. This operation will be described with reference to FIG. 23 further below.

As described above, in the stylus pen 400 according to another embodiment, the resonant frequency may be varied according to the writing pressure, and the contact pressure of the stylus pen may be detected in the touch panel 100 side through the varied resonant frequency.

FIG. 22 is a circuit diagram of a stylus pen according to another embodiment of the present disclosure.

Referring to FIG. 22, the resonant circuit 420 may be configured of an inductor 421, a capacitor 422, and a variable capacitor 424. One end of the resonant circuit 420 may be coupled to the conductive tip 410 and the other end of the resonant circuit 420 may be grounded. The ground may be coupled to an outer surface of a case of the stylus pen 400, and may be grounded by the user of the stylus pen 400.

Figure 24:
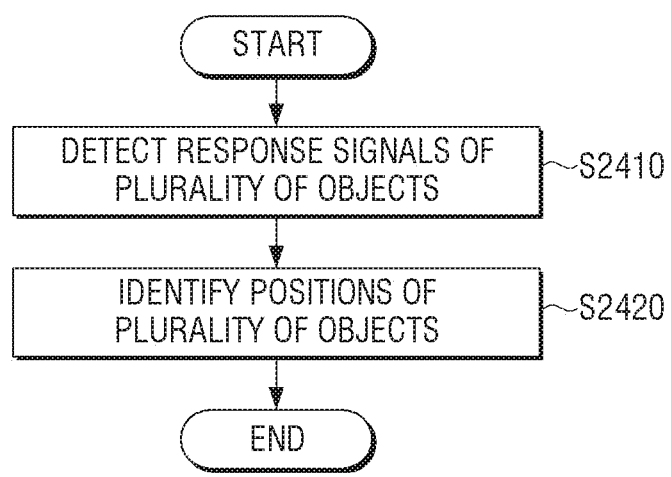
FIG. 24 is a flowchart illustrating a control method of a touch panel according to an embodiment of the present disclosure.

The inductor 421 and the capacitor 422 may be coupled in parallel, and may be operated as a resonant circuit. The resonant circuit may have a high-impedance characteristic in a specific resonant frequency. The resonant frequency generated in the resonant circuit may be changed in a manufacturing process or in a using process. The resonant circuit 420 may include a tuning cap 426 as illustrated in FIG. 24 so as to tune the resonant frequency.

The variable capacitor 424 may be coupled to the resonant circuit in parallel, and the capacitance of the variable capacitor 424 may be varied according to contact pressure of the conductive tip. In response to the contact pressure of the conductive tip being changed, the capacitance of the variable capacitor 424 may be varied, and the resonant frequency may be varied.

It has been described that the resonant frequency is varied using the variable capacitor 424, but the resonant circuit 420 may be implemented to perform the same function using a variable inductor of which inductance is variable according to the contact pressure of the conductive tip.

Figure 23:
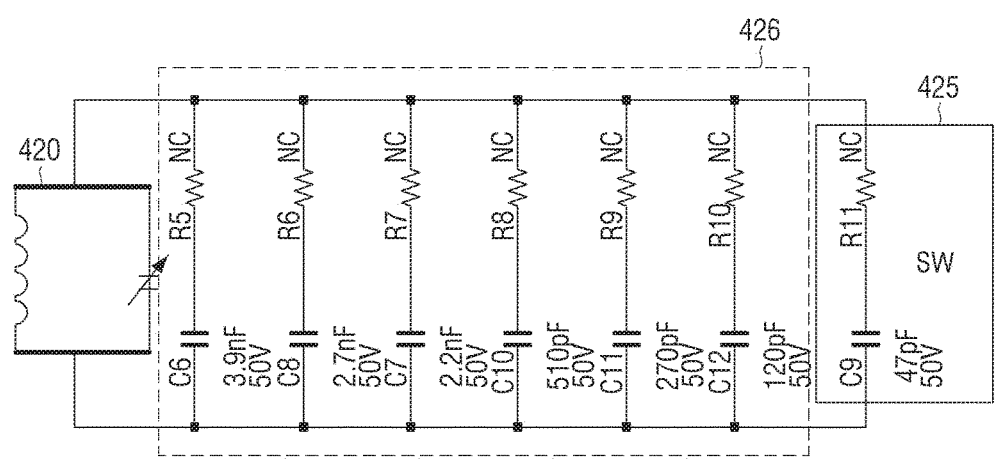
FIG. 23 is a circuit diagram illustrating a detailed configuration of a resonant circuit of FIG. 21 according to an embodiment of the present disclosure.

FIG. 23 is a circuit diagram illustrating a detailed configuration of the resonant circuit of FIG. 22 according to an embodiment of the present disclosure.

Referring to FIG. 23, the inductor 421 and the capacitor 422 may be coupled in parallel, and may be operated as a resonant circuit. The switch cap 425 and a plurality of tuning caps 426 may be disposed in parallel to the resonant circuit.

The switch cap 425 may be a cap region which is selectively coupled to the resonant circuit in parallel according to the switch selection of the user.

The tuning cap 426 may be a circuit configuration coupled to the resonant circuit in parallel according to an operation of the user, and may be used to tune a resonant frequency of the stylus pen at the initial launch.

It has been illustrated in FIG. 23 that a variable capacitor is not disposed, but the resonant circuit may be implemented that the variable capacitor may be coupled to the resonant circuit in parallel.

FIG. 24 is a flowchart illustrating a control method of a touch pane according to an embodiment of the present disclosure.

Referring to FIG. 24, first, a touch panel may receive response signals of a plurality of objects at operation S2410. For example, the touch panel may receive a plurality of response signals having different frequencies from a plurality of antenna loop. In this example, the touch panel may receive the response signals of the plurality of antenna loops in one channel units or may receive the response signals of the plurality of antenna loops in units of a plurality of channels.

The touch panel may identify positions of the plurality of objects based on the plurality of received response signals at operation S2420. For example, the touch panel may determine a position of an object corresponding to a corresponding frequency band based on a magnitude ratio of a specific frequency component in the response signal received from a first antenna loop and a magnitude ratio of a specific frequency component in the response signal received from a second antenna loop with respective to a plurality of objects.

The control method of the touch panel according to an embodiment may determine positions of a plurality of stylus pens through a frequency analysis method using response signals having different frequencies. The touch panel may simultaneously determine the positions of the plurality of stylus pens. The control method as illustrated in FIG. 24 may be executed on the touch panel having the configuration of FIG. 2. The control method of FIG. 24 may be executed on touch panels having other configurations.

The above-described control method may be implemented with program executable in the controller 140 of FIG. 2, and the program may be stored in a non-transitory computer-readable medium and provided.

The non-transitory readable medium is not a medium configured to temporarily store data such as a register, a cache, or a memory but an apparatus-readable medium configured to permanently or semi-permanently store data.

Figure 25:
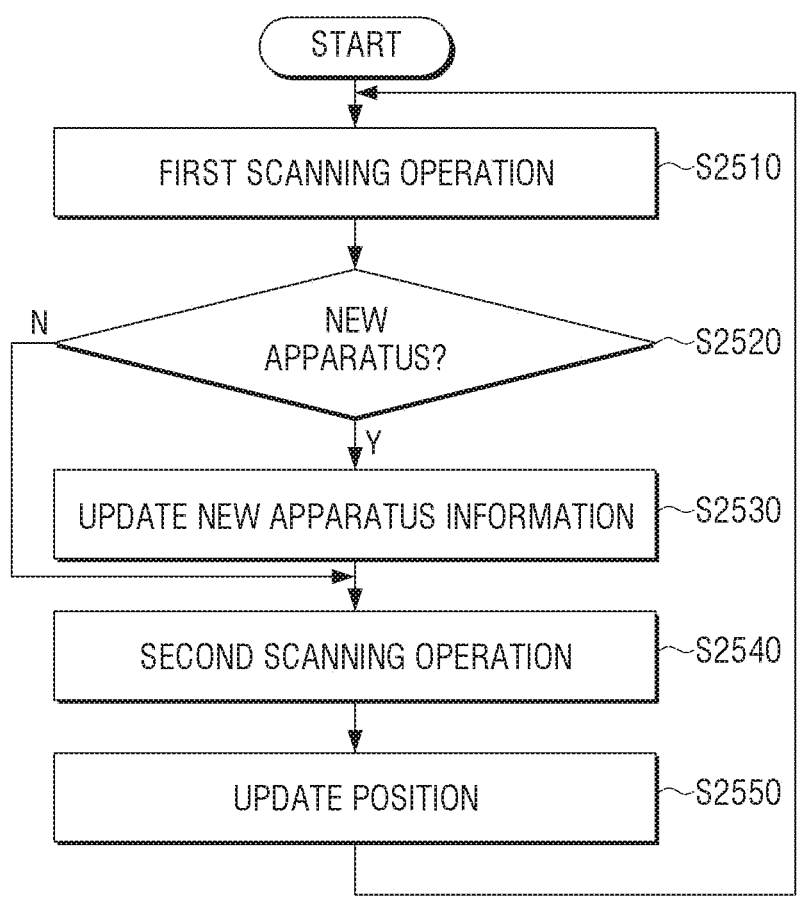
FIG. 25 is a flowchart illustrating a control method of a touch panel according to another embodiment of the present disclosure.

FIG. 25 is a flowchart illustrating a control method of a touch panel according to another embodiment of the present disclosure.

Referring to FIG. 25, the touch panel may perform a first scanning (or global) scanning operation at operation S2510. For example, to detect various types of the stylus pens, the touch panel may apply a driving signal to a plurality of antenna loops and determine positions of the plurality of stylus pens based on response signals received in the plurality of antenna loops.

The touch panel may determine whether or not new stylus pen is detected at operation S2520. As a result of determination in operation S2520, in response to the new apparatus being detected at operation S2520-Y, the touch panel may update new apparatus information at operation S2530. For example, the touch panel may output a type and position of the new apparatus. The touch panel may perform a second scanning (or local scanning) operation on the new stylus pen and the existing stylus pens at operation S2540.

As a result of determination in operation S2520, in response to the new apparatus being not detected at operation S2520-N, the touch panel may perform the second scanning operation on the detected existing stylus pen at operation S2540. The second scanning operation may be performed according to the type of pre-detected stylus pen.

The touch panel may update positions of the plurality of stylus pens based on the positions detected through the second scanning operation at operation S2550.

The above-described control method of a touch panel according to another embodiment may simultaneously determine the positions for the different types of stylus pens, and the user convenience may be improved. The control method may perform the position determination in a two stage, and thus the coordinate indication may be performed fast and efficiently. The control method as illustrated in FIG. 25 may be performed on the touch panel having the configuration of FIG. 2 or may be performed on touch panels having other configurations.

The above-described control method may be implemented with program executable in the controller 140 of FIG. 2, and the program may be stored in a non-transitory computer-readable medium and provided.

Figure 26:
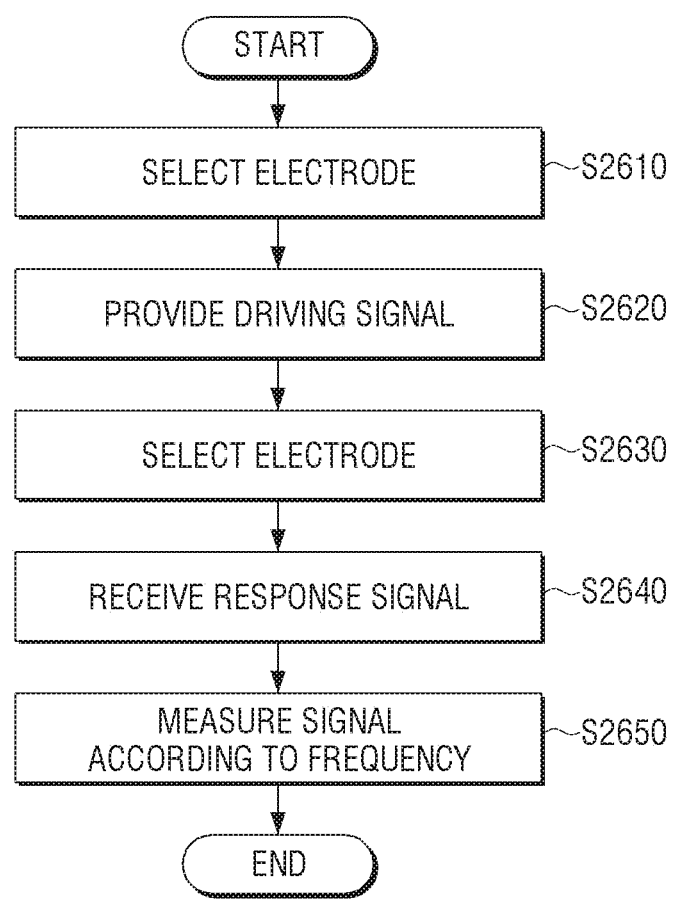
FIG. 26 is a flowchart illustrating a detailed operation of a first scanning operation of FIG. 25 according to an embodiment of the present disclosure.

FIG. 26 is a flowchart illustrating a detailed operation of the first scanning operation of FIG. 25 according to an embodiment of the present disclosure.

Referring to FIG. 26, the touch panel may select an antenna loop to which the driving signal is to be applied among the plurality of antenna loops at operation S2610, and the touch panel may apply the driving signal to a selected electrode at operation S2620.

The touch panel may select an antenna loop in which the response signal is to be received at operation S2630, and the touch panel may receive the response signal from the selected antenna loop at operation S2640. The touch panel may receive the response signals for all the antenna loops by performing the operation of applying the driving signal and receiving the response signal by the number of antenna loops.

The touch panel may determine the positions of the plurality of stylus pens based on signal magnitudes according to frequencies in the response signals of the channels at operation S2650.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch panel comprising:
   a receiver configured to include a plurality of antenna loops and to receive response signals from a plurality of objects;
   a detector configured to sequentially detect the response signals corresponding to the plurality of objects from the plurality of antenna loops in response to the response signals being simultaneously received through the receiver; and
   a controller configured to:
      identify positions of the plurality of objects based on different frequencies emitted from each of the plurality of objects,
      determine a type of a contact object, and
      identify a position of the contact object based on the type of the contact object using a response signal of a loop group corresponding to the contact object,
   wherein the controller is further configured to alternately perform a first scanning operation that determines a position of the contact object using all of the response signals of the plurality of antenna loops and a second scanning operation that determines a position of the contact object only using a response signal of the loop group corresponding to the contact object in the first scanning operation, and
   wherein the controller is further configured to determine a type of the contact object based on a frequency band of a response signal by the contact object, identify the position of the contact object by the type of the contact object using the response signal of the loop group corresponding to the contact object and perform the second scanning operation by classifying the second scanning operation according to the type of the contact object.

2. The touch panel of claim 1, wherein the controller is further configured to identify respective objects of the plurality of objects based on a different frequency band corresponding to each of the plurality of objects.

3. The touch panel of claim 1, wherein the detector includes:
   an amplifier configured to amplify the response signals received in at least one antenna loop through the receiver and output amplified response signals;

an analog to digital converter (ADC) configured to convert the amplified response signals to digital signals; and
a signal processor configured to extract preset frequency components from the digital signals.

4. The touch panel of claim 1, wherein the controller is further configured to determine the position of the contact object by additionally using a response signal of another loop group adjacent to the loop group in response to a number of contact objects determined in the second scanning operation being smaller than a number of contact objects determined in a previous process.

5. The touch panel of claim 1, wherein the receiver is further configured to include a plurality of electrodes.

6. The touch panel of claim 5, further comprising:
a driver configured to apply a driving signal to the plurality of electrodes before the first scanning operation.

7. The touch panel of claim 5, further comprising:
a driver configured to, in response to at least one of the contact objects being a passive stylus pen having a resonant circuit, apply a driving signal to the plurality of electrodes before the second scanning operation for determining a position of the passive stylus pen.

8. The touch panel of claim 5, wherein the plurality of antenna loops are arranged in a second layer below a first layer in which the plurality of electrodes are arranged.

9. A touch panel comprising:
a receiver configured to include a plurality of antenna loops and to receive response signals from a plurality of objects;
a detector configured to simultaneously detect the response signals corresponding to the plurality of objects from the plurality of antenna loops in response to the response signals being simultaneously received through the receiver; and
a controller configured to:
identify positions of the plurality of objects based on different frequencies emitted from each of the plurality of objects,
determine a type of a contact object, and
identify a position of the contact object based on the type of the contact object using a response signal of a loop group corresponding to the contact object,
wherein the detector is further configured to detect the response signals of the plurality of antenna loops in parallel in units of a plurality of channels,
wherein the controller is further configured to alternately perform a first scanning operation that determines a position of the contact object using all of the response signals of the plurality of antenna loops and a second scanning operation that determines a position of the contact object only using a response signal of the loop group corresponding to the contact object in the first scanning operation, and
wherein the controller is further configured to determine a type of the contact object based on a frequency band of a response signal by the contact object, identify the position of the contact object by the type of the contact object using the response signal of the loop group corresponding to the contact object and perform the second scanning operation by classifying the second scanning operation according to the type of the contact object.

* * * * *